US012431256B2

(12) United States Patent
Stripe et al.

(10) Patent No.: US 12,431,256 B2
(45) Date of Patent: Sep. 30, 2025

(54) SYSTEM AND METHOD FOR GENERATING A FOCUSED X-RAY BEAM

(71) Applicant: Sigray, Inc., Concord, CA (US)

(72) Inventors: Benjamin Donald Stripe, Berkeley, CA (US); Wenbing Yun, Walnut Creek, CA (US); Janos Kirz, Berkeley, CA (US); Thomas James Smart, Oakland, CA (US); Mark Antoine Cordier, El Sobrante, CA (US); Sylvia Jia Yun Lewis, San Francisco, CA (US)

(73) Assignee: Sigray, Inc., Benicia, CA (US)

( * ) Notice: Subject to any disclaimer, the term of this patent is extended or adjusted under 35 U.S.C. 154(b) by 0 days.

(21) Appl. No.: 19/052,937

(22) Filed: Feb. 13, 2025

(65) Prior Publication Data

US 2025/0266184 A1 Aug. 21, 2025

Related U.S. Application Data

(60) Provisional application No. 63/554,062, filed on Feb. 15, 2024.

(51) Int. Cl.

*G21K 1/06* (2006.01)
*G21K 1/02* (2006.01)

(52) U.S. Cl.

CPC .................................... *G21K 1/02* (2013.01)

(58) Field of Classification Search

CPC .......... G21K 1/00; G21K 1/003; G21K 1/006; G21K 5/04; G21K 7/00; G21K 2201/06; G21K 1/062; G21K 1/067; G02B 6/04; G02B 5/1814; G02B 5/1838; G02B 21/0052; G02B 21/0032; A61B 6/08; A61B 6/06; G01N 21/00; G01N 2021/0346

See application file for complete search history.

(56) References Cited

U.S. PATENT DOCUMENTS 4,169,228 A 9/1979 Briska et al.
4,642,811 A 2/1987 Georgopoulos
(Continued)

FOREIGN PATENT DOCUMENTS

CN 1656373 A 8/2005
CN 1829910 A 9/2006
(Continued)

OTHER PUBLICATIONS

"High performance benchtop EDXRF spectrometer with Windows®® software," published by: Rigaku Corp., Tokyo, Japan; 2017.

(Continued)

*Primary Examiner* — Don K Wong

(74) *Attorney, Agent, or Firm* — Knobbe, Martens, Olson & Bear, LLP

(57) ABSTRACT

An apparatus includes at least one x-ray source configured to generate x-rays and at least one capillary x-ray focusing optic configured to receive and focus at least some of the generated x-rays into a focused x-ray beam. The apparatus further includes at least one x-ray optical component configured to receive the generated x-rays and/or the focused x-ray beam such that a focus size $\delta_1$ of the focused x-ray beam is smaller than a focus size $\delta_0$ of the focused x-ray beam without the at least one x-ray optical component.

20 Claims, 7 Drawing Sheets

(56) References Cited

U.S. PATENT DOCUMENTS

| | | | |
|---|---|---|---|
| 4,945,552 | A | 7/1990 | Ueda |
| 5,016,265 | A | 5/1991 | Hoover et al. |
| 5,132,997 | A | 7/1992 | Kojima |
| 5,173,928 | A | 12/1992 | Momose et al. |
| 5,204,887 | A | 4/1993 | Hayashida et al. |
| 5,220,591 | A | 6/1993 | Ohsugi et al. |
| 5,249,216 | A | 9/1993 | Ohsugi et al. |
| 5,280,176 | A | 1/1994 | Jach et al. |
| 5,684,857 | A | 11/1997 | De Bokx |
| 5,732,120 | A | 3/1998 | Shoji et al. |
| 5,778,039 | A | 7/1998 | Hossain |
| 5,790,628 | A | 8/1998 | Ishida |
| 5,812,629 | A | 9/1998 | Clauser |
| 5,832,052 | A | 11/1998 | Hirose et al. |
| 5,912,940 | A | 6/1999 | O'Hara |
| 5,930,586 | A | 7/1999 | Jain et al. |
| 6,108,398 | A | 8/2000 | Mazor et al. |
| 6,181,773 | B1 | 1/2001 | Lee et al. |
| 6,195,410 | B1 | 2/2001 | Cash, Jr. |
| 6,226,347 | B1 | 5/2001 | Golenhofen |
| 6,381,303 | B1 | 4/2002 | Vu et al. |
| 6,430,254 | B2 | 8/2002 | Wilkins |
| 6,442,231 | B1 | 8/2002 | O'Hara |
| 6,456,688 | B1 | 9/2002 | Taguchi et al. |
| 6,504,902 | B2 | 1/2003 | Iwasaki et al. |
| 6,512,814 | B2 | 1/2003 | Yokhin et al. |
| 6,577,704 | B1 | 6/2003 | Holz |
| 6,611,577 | B1 | 8/2003 | Yamagami |
| 6,639,968 | B2 | 10/2003 | Yokhin et al. |
| 6,711,234 | B1 | 3/2004 | Loxley et al. |
| 6,763,086 | B2 | 7/2004 | Platonov |
| 6,829,327 | B1 | 12/2004 | Chen |
| 6,891,627 | B1 | 5/2005 | Levy et al. |
| 6,895,071 | B2 | 5/2005 | Yokhin et al. |
| 6,914,723 | B2 | 7/2005 | Yun et al. |
| 6,934,359 | B2 | 8/2005 | Chen |
| 7,006,596 | B1 | 2/2006 | Janik |
| 7,010,086 | B2 | 3/2006 | Chopra |
| 7,023,955 | B2 | 4/2006 | Chen et al. |
| 7,075,073 | B1 | 7/2006 | Janik et al. |
| 7,095,822 | B1 | 8/2006 | Yun |
| 7,119,953 | B2 | 10/2006 | Yun et al. |
| 7,120,228 | B2 | 10/2006 | Yokhin et al. |
| 7,180,979 | B2 | 2/2007 | Momose |
| 7,183,547 | B2 | 2/2007 | Yun et al. |
| 7,187,751 | B2 | 3/2007 | Kawahara et al. |
| 7,215,736 | B1 | 5/2007 | Wang et al. |
| 7,218,703 | B2 | 5/2007 | Yada et al. |
| 7,221,731 | B2 | 5/2007 | Yada et al. |
| 7,245,696 | B2 | 7/2007 | Yun et al. |
| 7,258,485 | B2 | 8/2007 | Nakano et al. |
| 7,268,945 | B2 | 9/2007 | Yun et al. |
| 7,388,942 | B2 | 6/2008 | Wang et al. |
| 7,394,890 | B1 | 7/2008 | Wang et al. |
| 7,400,704 | B1 | 7/2008 | Yun et al. |
| 7,406,151 | B1 | 7/2008 | Yun |
| 7,414,787 | B2 | 8/2008 | Yun et al. |
| 7,453,560 | B2 | 11/2008 | Miyake |
| 7,463,712 | B2 | 12/2008 | Zhu et al. |
| 7,486,770 | B2 | 2/2009 | Baumann |
| 7,492,871 | B2 | 2/2009 | Popescu |
| 7,499,521 | B2 | 3/2009 | Wang et al. |
| 7,515,684 | B2 | 4/2009 | Gibson et al. |
| 7,519,153 | B1 | 4/2009 | Moore |
| 7,522,698 | B2 | 4/2009 | Popescu |
| 7,522,708 | B2 | 4/2009 | Heismann |
| 7,532,704 | B2 | 5/2009 | Hempel |
| 7,551,719 | B2 | 6/2009 | Yokhin et al. |
| 7,551,722 | B2 | 6/2009 | Ohshima et al. |
| 7,561,662 | B2 | 7/2009 | Wang et al. |
| 7,564,941 | B2 | 7/2009 | Baumann |
| 7,639,786 | B2 | 12/2009 | Baumann |
| 7,646,843 | B2 | 1/2010 | Popescu et al. |
| 7,653,177 | B2 | 1/2010 | Baumann et al. |
| 7,680,243 | B2 | 3/2010 | Yokhin et al. |
| 7,778,389 | B2 | 8/2010 | Yoneyama |
| 7,787,588 | B1 | 8/2010 | Yun et al. |
| 7,796,725 | B1 | 9/2010 | Yun et al. |
| 7,796,726 | B1 | 9/2010 | Gendreau et al. |
| 7,809,113 | B2 | 10/2010 | Aoki et al. |
| 7,813,475 | B1 | 10/2010 | Wu et al. |
| 7,817,777 | B2 | 10/2010 | Baumann et al. |
| 7,848,483 | B2 | 12/2010 | Platonov |
| 7,864,922 | B2 | 1/2011 | Kawabe |
| 7,889,838 | B2 | 2/2011 | David et al. |
| 7,899,154 | B2 | 3/2011 | Chen et al. |
| 7,920,676 | B2 | 4/2011 | Yun et al. |
| 7,924,973 | B2 | 4/2011 | Kottler et al. |
| 7,945,018 | B2 | 5/2011 | Heismann |
| 7,949,092 | B2 | 5/2011 | Brons |
| 7,949,095 | B2 | 5/2011 | Ning |
| 7,974,379 | B1 | 7/2011 | Case et al. |
| 7,983,381 | B2 | 7/2011 | David et al. |
| 8,005,185 | B2 | 8/2011 | Popescu |
| 8,009,796 | B2 | 8/2011 | Popescu |
| 8,009,797 | B2 | 8/2011 | Ouchi |
| 8,041,004 | B2 | 10/2011 | David |
| 8,058,621 | B2 | 11/2011 | Kommareddy |
| 8,068,579 | B1 | 11/2011 | Yun et al. |
| 8,073,099 | B2 | 12/2011 | Niu et al. |
| 8,139,711 | B2 | 3/2012 | Takahashi |
| 8,165,270 | B2 | 4/2012 | David et al. |
| 8,184,771 | B2 | 5/2012 | Murakoshi |
| 8,233,587 | B2 | 7/2012 | Sato |
| 8,243,879 | B2 | 8/2012 | Itoh et al. |
| 8,306,183 | B2 | 11/2012 | Koehler |
| 8,351,570 | B2 | 1/2013 | Nakamura |
| 8,353,628 | B1 | 1/2013 | Yun et al. |
| 8,374,309 | B2 | 2/2013 | Donath |
| 8,451,975 | B2 | 5/2013 | Tada |
| 8,513,603 | B1 | 8/2013 | Lederman et al. |
| 8,559,594 | B2 | 10/2013 | Ouchi |
| 8,559,597 | B2 | 10/2013 | Chen et al. |
| 8,565,371 | B2 | 10/2013 | Bredno |
| 8,591,108 | B2 | 11/2013 | Tada |
| 8,602,648 | B1 | 12/2013 | Jacobsen et al. |
| 8,632,247 | B2 | 1/2014 | Ishii |
| 8,755,487 | B2 | 6/2014 | Kaneko |
| 8,767,915 | B2 | 7/2014 | Stutman |
| 8,767,916 | B2 | 7/2014 | Hashimoto |
| 8,781,069 | B2 | 7/2014 | Murakoshi |
| 8,824,629 | B2 | 9/2014 | Ishii |
| 8,855,265 | B2 | 10/2014 | Engel |
| 8,859,977 | B2 | 10/2014 | Kondoh |
| 8,908,824 | B2 | 12/2014 | Kondoh |
| 8,972,191 | B2 | 3/2015 | Stampanoni et al. |
| 8,989,474 | B2 | 3/2015 | Kido et al. |
| 9,001,967 | B2 | 4/2015 | Baturin |
| 9,016,943 | B2 | 4/2015 | Jacobsen et al. |
| 9,025,725 | B2 | 5/2015 | Kiyohara et al. |
| 9,031,201 | B2 | 5/2015 | Sato |
| 9,036,773 | B2 | 5/2015 | David et al. |
| 9,063,055 | B2 | 6/2015 | Ouchi |
| 9,086,536 | B2 | 7/2015 | Pang et al. |
| 9,129,715 | B2 | 9/2015 | Adler et al. |
| 9,222,899 | B2 | 12/2015 | Yamaguchi |
| 9,230,703 | B2 | 1/2016 | Mohr et al. |
| 9,234,856 | B2 | 1/2016 | Mukaide |
| 9,291,578 | B2 | 3/2016 | Adler |
| 9,329,141 | B2 | 5/2016 | Stutman |
| 9,357,975 | B2 | 6/2016 | Baturin |
| 9,439,613 | B2 | 9/2016 | Stutman |
| 9,448,190 | B2 | 9/2016 | Yun et al. |
| 9,453,803 | B2 | 9/2016 | Radicke |
| 9,480,447 | B2 | 11/2016 | Mohr et al. |
| 9,486,175 | B2 | 11/2016 | Fredenberg et al. |
| 9,494,534 | B2 | 11/2016 | Baturin |
| 9,532,760 | B2 | 1/2017 | Anton et al. |
| 9,541,511 | B2 | 1/2017 | Vigliante |
| 9,551,677 | B2 | 1/2017 | Mazor et al. |
| 9,557,280 | B2 | 1/2017 | Pfeiffer et al. |
| 9,570,265 | B1 | 2/2017 | Yun et al. |
| 9,588,066 | B2 | 3/2017 | Pois et al. |
| 9,594,036 | B2 | 3/2017 | Yun et al. |

(56) References Cited

U.S. PATENT DOCUMENTS

| | | | |
|---|---|---|---|
| 9,632,040 | B2 | 4/2017 | Stutman |
| 9,700,267 | B2 | 7/2017 | Baturin et al. |
| 9,719,947 | B2 | 8/2017 | Yun et al. |
| 9,748,012 | B2 | 8/2017 | Yokoyama |
| 9,757,081 | B2 | 9/2017 | Proksa |
| 9,761,021 | B2 | 9/2017 | Koehler |
| 9,770,215 | B2 | 9/2017 | Souchay et al. |
| 9,778,213 | B2 | 10/2017 | Bakeman et al. |
| 9,823,203 | B2 | 11/2017 | Yun et al. |
| 9,826,949 | B2 | 11/2017 | Ning |
| 9,841,388 | B2 | 12/2017 | Creux et al. |
| 9,861,330 | B2 | 1/2018 | Rossl |
| 9,874,531 | B2 | 1/2018 | Yun et al. |
| 9,881,710 | B2 | 1/2018 | Roessl |
| 9,916,655 | B2 | 3/2018 | Sampanoni |
| 10,028,716 | B2 | 7/2018 | Rossl |
| 10,045,753 | B2 | 8/2018 | Teshima |
| 10,074,451 | B2 | 9/2018 | Kottler et al. |
| 10,076,297 | B2 | 9/2018 | Bauer |
| 10,085,701 | B2 | 10/2018 | Hoshino |
| 10,141,081 | B2 | 11/2018 | Preusche |
| 10,151,713 | B2 | 12/2018 | Wu et al. |
| 10,153,061 | B2 | 12/2018 | Yokoyama |
| 10,153,062 | B2 | 12/2018 | Gall et al. |
| 10,247,683 | B2 | 4/2019 | Yun et al. |
| 10,267,752 | B2 | 4/2019 | Zhang et al. |
| 10,267,753 | B2 | 4/2019 | Zhang et al. |
| 10,295,485 | B2 | 5/2019 | Yun et al. |
| 10,304,580 | B2 | 5/2019 | Yun et al. |
| 10,349,908 | B2 | 7/2019 | Yun et al. |
| 10,352,695 | B2 | 7/2019 | Dziura et al. |
| 10,352,880 | B2 | 7/2019 | Yun et al. |
| 10,401,309 | B2 | 9/2019 | Yun et al. |
| 10,416,099 | B2 | 9/2019 | Yun et al. |
| 10,466,185 | B2 | 11/2019 | Yun et al. |
| 10,473,598 | B2 | 11/2019 | Ogata et al. |
| 10,485,492 | B2 | 11/2019 | Koehler et al. |
| 10,514,345 | B2 | 12/2019 | Ogata et al. |
| 10,514,346 | B2 | 12/2019 | Sako |
| 10,568,588 | B2 | 2/2020 | Koehler et al. |
| 10,578,566 | B2 | 3/2020 | Yun et al. |
| 10,634,628 | B2 | 4/2020 | Kasper et al. |
| 10,653,376 | B2 | 5/2020 | Yun et al. |
| 10,697,902 | B2 | 6/2020 | Sharma et al. |
| 10,782,252 | B2 | 9/2020 | Gateshki et al. |
| 10,794,845 | B2 | 10/2020 | Filsinger |
| 10,895,541 | B2 | 1/2021 | Shchegrov et al. |
| 10,962,491 | B2 | 3/2021 | Yun et al. |
| 10,976,270 | B2 | 4/2021 | Wormington |
| 10,989,819 | B2 | 4/2021 | Wieczorek et al. |
| 11,054,375 | B2 | 7/2021 | Seidler et al. |
| 11,175,243 | B1 | 11/2021 | Yun et al. |
| 11,215,572 | B2 | 1/2022 | Yun et al. |
| 11,549,895 | B2 | 1/2023 | Yun et al. |
| 11,686,692 | B2 | 6/2023 | Vine et al. |
| 11,733,185 | B2 | 8/2023 | Ogata et al. |
| 11,796,490 | B2 | 10/2023 | Seidler et al. |
| 11,885,755 | B2 | 1/2024 | Yun et al. |
| 12,209,977 | B2 | 1/2025 | Yun et al. |
| 2001/0046276 | A1 | 11/2001 | Schneider et al. |
| 2002/0090051 | A1 | 7/2002 | Oikawa |
| 2002/0150208 | A1 | 10/2002 | Yohkin et al. |
| 2003/0072413 | A1 | 4/2003 | Yokhin et al. |
| 2003/0142781 | A1 | 7/2003 | Kawahara |
| 2003/0223536 | A1 | 12/2003 | Yun et al. |
| 2004/0028186 | A1 | 2/2004 | Yokhin et al. |
| 2004/0047446 | A1 | 3/2004 | Platonov |
| 2005/0087699 | A1 | 4/2005 | Miyake |
| 2005/0265517 | A1 | 12/2005 | Gary |
| 2005/0282300 | A1 | 12/2005 | Yun et al. |
| 2005/0286680 | A1 | 12/2005 | Momose |
| 2006/0062350 | A1 | 3/2006 | Yokhin |
| 2006/0088139 | A1 | 4/2006 | Nankano et al. |
| 2006/0120508 | A1 | 6/2006 | Chen |
| 2006/0169893 | A1 | 8/2006 | Lee et al. |
| 2006/0182322 | A1 | 8/2006 | Bernhardt et al. |
| 2007/0069154 | A1 | 3/2007 | Sullivan |
| 2007/0108387 | A1 | 5/2007 | Yun et al. |
| 2007/0183563 | A1 | 8/2007 | Baumann |
| 2007/0183579 | A1 | 8/2007 | Baumann et al. |
| 2007/0189449 | A1 | 8/2007 | Baumann |
| 2007/0248215 | A1 | 10/2007 | Ohshima et al. |
| 2007/0285643 | A1 | 12/2007 | Wedowski et al. |
| 2008/0043908 | A1 | 2/2008 | Teramoto et al. |
| 2008/0084966 | A1 | 4/2008 | Aoki et al. |
| 2008/0159475 | A1 | 7/2008 | Mazor et al. |
| 2008/0170662 | A1 | 7/2008 | Reinhold |
| 2008/0181363 | A1 | 7/2008 | Fenter et al. |
| 2008/0273662 | A1 | 11/2008 | Yun |
| 2009/0003516 | A1 | 1/2009 | Chen et al. |
| 2009/0052619 | A1 | 2/2009 | Endoh |
| 2009/0092227 | A1 | 4/2009 | David |
| 2009/0154640 | A1 | 6/2009 | Baumann et al. |
| 2009/0316857 | A1 | 12/2009 | David et al. |
| 2010/0061508 | A1 | 3/2010 | Takahashi |
| 2010/0091947 | A1 | 4/2010 | Niu |
| 2010/0172470 | A1 | 7/2010 | Kuwabara |
| 2010/0246765 | A1 | 9/2010 | Murakoshi |
| 2010/0284513 | A1 | 11/2010 | Kawabe |
| 2010/0310041 | A1 | 12/2010 | Adams et al. |
| 2010/0329532 | A1 | 12/2010 | Masuda et al. |
| 2011/0206179 | A1 | 8/2011 | Bendahan |
| 2011/0222650 | A1 | 9/2011 | Muenker |
| 2011/0243302 | A1 | 10/2011 | Murakoshi |
| 2011/0261164 | A1 | 10/2011 | Olesen et al. |
| 2011/0268252 | A1 | 11/2011 | Ozawa et al. |
| 2012/0041679 | A1 | 2/2012 | Stampanoni |
| 2012/0224670 | A1 | 9/2012 | Kiyohara et al. |
| 2012/0228475 | A1 | 9/2012 | Pang et al. |
| 2013/0011040 | A1 | 1/2013 | Kido et al. |
| 2013/0039460 | A1 | 2/2013 | Levy |
| 2013/0108012 | A1 | 5/2013 | Sato |
| 2013/0108022 | A1 | 5/2013 | Kugland et al. |
| 2013/0202084 | A1 | 8/2013 | Piorek et al. |
| 2013/0251100 | A1 | 9/2013 | Sasaki et al. |
| 2013/0308112 | A1 | 11/2013 | Clube et al. |
| 2014/0023973 | A1 | 1/2014 | Marconi et al. |
| 2014/0037052 | A1 | 2/2014 | Adler |
| 2014/0064445 | A1 | 3/2014 | Adler |
| 2014/0072104 | A1 | 3/2014 | Jacobsen et al. |
| 2014/0105353 | A1 | 4/2014 | Pfeiffer et al. |
| 2014/0105363 | A1 | 4/2014 | Chen et al. |
| 2014/0112440 | A1 | 4/2014 | David et al. |
| 2014/0146945 | A1 | 5/2014 | Fredenberg et al. |
| 2014/0153692 | A1 | 6/2014 | Larkin et al. |
| 2014/0205057 | A1 | 7/2014 | Koehler et al. |
| 2014/0226785 | A1 | 8/2014 | Stutman et al. |
| 2014/0270060 | A1 | 9/2014 | Date et al. |
| 2015/0023472 | A1 | 1/2015 | Schmitt et al. |
| 2015/0030126 | A1 | 1/2015 | Radicke |
| 2015/0043713 | A1 | 2/2015 | Chen |
| 2015/0049860 | A1 | 2/2015 | Das |
| 2015/0051877 | A1 | 2/2015 | Bakeman et al. |
| 2015/0055743 | A1 | 2/2015 | Vedantham et al. |
| 2015/0055745 | A1 | 2/2015 | Holzner et al. |
| 2015/0071402 | A1 | 3/2015 | Handa |
| 2015/0117599 | A1 | 4/2015 | Yun et al. |
| 2015/0146847 | A1 | 5/2015 | Liu |
| 2015/0160354 | A1 | 6/2015 | Mertens et al. |
| 2015/0243397 | A1 | 8/2015 | Yun et al. |
| 2015/0247811 | A1 | 9/2015 | Yun et al. |
| 2015/0260663 | A1 | 9/2015 | Yun et al. |
| 2015/0270023 | A1 | 9/2015 | Adler |
| 2015/0323474 | A1 | 11/2015 | Case et al. |
| 2015/0323478 | A1 | 11/2015 | Stutman |
| 2015/0357069 | A1 | 12/2015 | Yun et al. |
| 2016/0047759 | A1 | 2/2016 | Wang et al. |
| 2016/0066870 | A1 | 3/2016 | Yun et al. |
| 2016/0091701 | A1 | 3/2016 | Raghunathan |
| 2016/0109389 | A1 | 4/2016 | Suzuki et al. |
| 2016/0178541 | A1 | 6/2016 | Hwang et al. |
| 2016/0206259 | A1 | 7/2016 | Auclair et al. |
| 2016/0341674 | A1 | 11/2016 | Wu et al. |
| 2016/0351283 | A1 | 12/2016 | Adler et al. |

(56) References Cited

U.S. PATENT DOCUMENTS

| | | | |
|---|---|---|---|
| 2017/0038481 A1 | 2/2017 | Cheng et al. | |
| 2017/0047191 A1 | 2/2017 | Yun et al. | |
| 2017/0162288 A1 | 6/2017 | Yun et al. | |
| 2017/0176356 A1 | 6/2017 | Hoffman et al. | |
| 2017/0184520 A1 | 6/2017 | Mortensen et al. | |
| 2017/0227476 A1 | 8/2017 | Zhang et al. | |
| 2017/0234811 A1 | 8/2017 | Zhang et al. | |
| 2017/0261442 A1 | 9/2017 | Yun et al. | |
| 2017/0336334 A1 | 11/2017 | Yun et al. | |
| 2018/0182131 A1 | 6/2018 | Koehler et al. | |
| 2018/0202951 A1 | 7/2018 | Yun et al. | |
| 2018/0261352 A1 | 9/2018 | Matsuyama et al. | |
| 2018/0306734 A1 | 10/2018 | Morimoto et al. | |
| 2018/0323032 A1 | 11/2018 | Strelec et al. | |
| 2018/0348151 A1 | 12/2018 | Kasper et al. | |
| 2019/0011379 A1 | 1/2019 | Yun et al. | |
| 2019/0017946 A1 | 1/2019 | Wack et al. | |
| 2019/0027265 A1 | 1/2019 | Dey et al. | |
| 2019/0064084 A1 | 2/2019 | Ullom et al. | |
| 2019/0086342 A1 | 3/2019 | Pois et al. | |
| 2019/0115184 A1 | 4/2019 | Zalubovsky | |
| 2019/0145917 A1 | 5/2019 | Yun et al. | |
| 2019/0172681 A1 | 6/2019 | Owen et al. | |
| 2019/0204757 A1 | 7/2019 | Brussard et al. | |
| 2019/0206652 A1 | 7/2019 | Akinwande et al. | |
| 2019/0212281 A1 | 7/2019 | Shchgegrov | |
| 2019/0216416 A1 | 7/2019 | Koehler et al. | |
| 2019/0219713 A1 | 7/2019 | Booker et al. | |
| 2019/0257774 A1 | 8/2019 | Seidler et al. | |
| 2019/0261935 A1 | 8/2019 | Kitamura | |
| 2019/0302042 A1 | 10/2019 | Yun et al. | |
| 2019/0317027 A1 | 10/2019 | Tsuboi et al. | |
| 2019/0323976 A1 | 10/2019 | Vinshtein | |
| 2019/0331616 A1 | 10/2019 | Schaff et al. | |
| 2019/0369271 A1 | 12/2019 | Yun et al. | |
| 2019/0369272 A1 | 12/2019 | Yun et al. | |
| 2019/0391087 A1 | 12/2019 | Matejka et al. | |
| 2020/0003712 A1 | 1/2020 | Kataoka et al. | |
| 2020/0041429 A1 | 2/2020 | Cho et al. | |
| 2020/0072770 A1 | 3/2020 | Yun et al. | |
| 2020/0088656 A1 | 3/2020 | Pois et al. | |
| 2020/0090826 A1 | 3/2020 | Adler | |
| 2020/0098537 A1 | 3/2020 | Yun et al. | |
| 2020/0103358 A1 | 4/2020 | Wiell et al. | |
| 2020/0155088 A1 | 5/2020 | Gruener et al. | |
| 2020/0158662 A1 | 5/2020 | Horiba et al. | |
| 2020/0182806 A1 | 6/2020 | Kappler et al. | |
| 2020/0225172 A1 | 7/2020 | Sato et al. | |
| 2020/0225173 A1 | 7/2020 | Sato et al. | |
| 2020/0225371 A1 | 7/2020 | Greenberg et al. | |
| 2020/0232937 A1 | 7/2020 | Yaroshenko et al. | |
| 2020/0279351 A1 | 9/2020 | Ratner et al. | |
| 2020/0292475 A1 | 9/2020 | Cao et al. | |
| 2020/0300789 A1 | 9/2020 | Osakabe et al. | |
| 2020/0300790 A1 | 9/2020 | Gellineau et al. | |
| 2020/0303265 A1 | 9/2020 | Gellineau et al. | |
| 2020/0319120 A1 | 10/2020 | Kitamura et al. | |
| 2020/0337659 A1 | 10/2020 | Sano et al. | |
| 2020/0378905 A1 | 12/2020 | Safai | |
| 2020/0378908 A1 | 12/2020 | Fujimura et al. | |
| 2021/0055237 A1 | 2/2021 | Shchegrov et al. | |
| 2021/0080408 A1 | 3/2021 | Yun et al. | |
| 2021/0116399 A1 | 4/2021 | Ogata et al. | |
| 2021/0236069 A1 | 8/2021 | Kotian | |
| 2021/0255123 A1 | 8/2021 | Koskinen et al. | |
| 2021/0356412 A1 | 11/2021 | Yun et al. | |
| 2022/0003694 A1 | 1/2022 | Seidler et al. | |
| 2022/0026377 A1 | 1/2022 | Yamamoto | |
| 2022/0082515 A1 | 3/2022 | Yun et al. | |
| 2022/0178851 A1 | 6/2022 | Yun et al. | |
| 2022/0404297 A1 | 12/2022 | Nii | |
| 2023/0280291 A1* | 9/2023 | Yun .................... | G01N 23/2204 378/44 |
| 2023/0349842 A1 | 11/2023 | Yun et al. | |
| 2024/0280515 A1 | 8/2024 | Yun et al. | |

FOREIGN PATENT DOCUMENTS

| | | | |
|---|---|---|---|
| CN | 101257851 | B | 9/2008 |
| CN | 101532969 | B | 9/2009 |
| CN | 101566591 | A | 10/2009 |
| CN | 101576515 | A | 11/2009 |
| CN | 101413905 | A | 3/2011 |
| CN | 102325498 | B | 1/2012 |
| CN | 102507623 | A | 6/2012 |
| CN | 102551761 | A | 7/2012 |
| CN | 103604818 | A | 2/2014 |
| CN | 104264228 | A | 1/2015 |
| CN | 104068875 | A | 5/2017 |
| CN | 206531787 | U | 9/2017 |
| CN | 113218974 | | 8/2021 |
| DE | 102007048743 | A1 | 6/2010 |
| DE | 102013013344 | A1 | 2/2015 |
| EP | 0751533 | | 1/1997 |
| EP | 1169713 | | 1/2006 |
| EP | 2592626 | | 5/2013 |
| EP | 3168856 | A2 | 5/2017 |
| JP | H01-097844 | A | 4/1989 |
| JP | H04-285847 | A | 10/1992 |
| JP | H06-188092 | | 7/1994 |
| JP | H06-213833 | A | 8/1994 |
| JP | H07-194592 | | 8/1995 |
| JP | H07-311165 | A | 11/1995 |
| JP | H08-061941 | A | 3/1996 |
| JP | H08-128971 | | 5/1996 |
| JP | H08-184572 | | 7/1996 |
| JP | H09-166488 | | 6/1997 |
| JP | H10-318737 | A | 12/1998 |
| JP | H11-006804 | A | 1/1999 |
| JP | H11-304728 | | 11/1999 |
| JP | H11-352079 | | 12/1999 |
| JP | 2001-021507 | | 1/2001 |
| JP | 2001-124711 | | 5/2001 |
| JP | 2001-235437 | | 8/2001 |
| JP | 2002-214165 | | 7/2002 |
| JP | 2003-149392 | | 5/2003 |
| JP | 2003-329616 | | 11/2003 |
| JP | 2004-333131 | | 11/2004 |
| JP | 2005-233760 | | 9/2005 |
| JP | 2006-501444 | | 1/2006 |
| JP | 2007-212272 | A | 8/2007 |
| JP | 2007-218683 | | 8/2007 |
| JP | 2008-200359 | | 4/2008 |
| JP | 2008-145111 | | 6/2008 |
| JP | 2008-197495 | | 8/2008 |
| JP | 2009-195349 | | 3/2009 |
| JP | 2009-139337 | | 6/2009 |
| JP | 2010-032341 | A | 2/2010 |
| JP | 2010-127924 | | 6/2010 |
| JP | 2010-236986 | | 10/2010 |
| JP | 2011-033537 | | 2/2011 |
| JP | 2011-095224 | | 5/2011 |
| JP | 2011-107005 | | 6/2011 |
| JP | 2011-218147 | | 11/2011 |
| JP | 2012-032387 | | 2/2012 |
| JP | 2007-309687 | | 6/2012 |
| JP | 2012-112790 | | 6/2012 |
| JP | 2012-112914 | | 6/2012 |
| JP | 2012-187341 | | 10/2012 |
| JP | H06-102399 | A | 10/2012 |
| JP | 2008-039772 | | 12/2012 |
| JP | 2012-254294 | | 12/2012 |
| JP | 2013-042983 | | 3/2013 |
| JP | 2013-096750 | | 5/2013 |
| JP | 2013-113782 | | 6/2013 |
| JP | 2013-181811 | | 9/2013 |
| JP | 2014-222191 | | 11/2014 |
| JP | 2015-047306 | | 3/2015 |
| JP | 2015-072263 | | 4/2015 |
| JP | 2015-077289 | | 4/2015 |
| JP | 2017-040618 | | 2/2017 |
| JP | 2019-078593 | | 5/2019 |
| KR | 10-2004-0072780 | | 8/2004 |
| KR | 10-2006-0088272 | A | 8/2006 |
| KR | 10-2012-0012391 | | 2/2012 |

(56) References Cited

FOREIGN PATENT DOCUMENTS

| | | |
|---|---|---|
| KR | 10-2012-0091591 A | 8/2012 |
| KR | 10-2014-0059688 | 5/2014 |
| WO | WO 1998/041992 | 9/1998 |
| WO | WO 2006/010091 | 1/2006 |
| WO | WO 2007/125833 | 11/2007 |
| WO | WO 2008/068044 | 6/2008 |
| WO | WO 2009/104560 | 8/2009 |
| WO | WO 2009/121932 | 10/2009 |
| WO | WO 2011/032572 | 3/2011 |
| WO | WO 2012/032950 | 3/2012 |
| WO | WO 2013/004574 | 1/2013 |
| WO | WO 2013/111050 | 8/2013 |
| WO | WO 2013/160153 | 10/2013 |
| WO | WO 2015/066333 | 5/2015 |
| WO | WO 2015/168473 | 11/2015 |
| WO | WO 2015/176023 | 11/2015 |
| WO | WO 2015/187219 | 12/2015 |
| WO | WO 2016/187623 | 11/2016 |
| WO | WO 2017/031740 | 3/2017 |
| WO | WO 2017/213996 | 12/2017 |
| WO | WO 2018/122213 | 7/2018 |
| WO | WO 2018/175570 | 9/2018 |

OTHER PUBLICATIONS

Abramson et al., "hklhop: a Selection Tool for Asymmetric Reflections of Spherically Bent Crystal Analysers for High Resolution X-ray Spectroscopy," arXiv:2409.10698 (2024).

Altapova et al., "Phase contrast laminography based on Talbot interferometry," Opt. Express, vol. 20, No. 6, (2012) pp. 6496-6508.

Andreyev et al., "Boosting the versatility of X-ray microscopes by using robotic arm sample holders," 13th Conf. on Ind. Comp. Tomography, doi.org/10.58286/29261 (2024).

Anklamm et al., "A novel von Hamos spectrometer for efficient X-ray emission spectroscopy in the laboratory," Rev. Sci. Instr. vol. 85 p. 053110 (2014).

Arsana et al., "Laboratory Liquid-Jet X-ray Microscopy and X-ray Fluorescence Imaging for Biomedical Applications," Int'l J. Mol. Sci., vol. 25, p. 920 (2024).

Bachucki et al., "Laboratory-based double X-ray spectrometer for simultaneous X-ray emission and X-ray absorption studies," J. Anal. Atomic Spectr. DOI:10.1039/C9JA00159J (2019).

Baron et al., "A compact optical design for Bragg reflections near backscattering," J. Synchrotron Rad., vol. 8 (2001), pp. 1127-1130.

Bauer et al., "Increasing the sensitivity of micro X-ray fluorescence spectroscopy through an optimized|adaptation of polycapillary lenses to a liquid metal jet source," J. Anal. At. Spectrom. DOI:10.1039/d1ja00295c (2021).

Bech, "X-ray imaging with a grating interferometer," University of Copenhagen PhD. Thesis, (May 1, 2009).

Bech, "In-vivo dark-field and phase-contrast x-ray imaging," Scientific Reports 3, (2013), Article No. 03209.

Bertaux et al., "Sub-pixel high-resolution imaging of high-energy x-rays inspired by sub-wavelength optical imaging, " Op. Express, vol. 29, No. 22-25, p. 35003 (2021).

Bertilson et al., "Analyzer-free Hard X-ray Interferometry," Phys. Med. Biol. https://doi.org/10.1088/1361-6560/ad1f84 (2024).

Birkholz, "Chapter 4: Grazing Incidence Configurations," Thin Film Analysis by X-ray Scattering (Wiley-VCH Verlag GmbH & Co. KGaA, Weinheim, Germany, 2006).

Birnbacher et al., "Quantitative X-ray phase contrast computed tomography with grating interferometry," European J. of Nucl. Med. and Mol. Imaging, https://doi.org/10.1007/s00259-021-05259-6 (2021).

Bogdanowicz et al., "Model-free measurement of lateral recess in gate-all-around transistors with micro hard-X-ray fluorescence," J. Micro/Nanopattern, Mater. Metrol., vol. 22(3), pp. 034001-1-8 (2023).

Brombal et al., "PEPI Lab: a flexible compact multi-modal setup for X-ray phase-contrast and spectral imaging," Sci. Rep. 13, p. 4206, https://doi.org/10.1038/s41598-023-30316-5 (2023).

Buchanan et al., "Effective modelling of high-energy laboratory-based x-ray phase contrast imaging utilising absorption masks or gratings," J. Appl. Physics (accepted) (2020).

Celio et al., "Laboratory X-Ray-Assisted Device Alteration for Fault Isolation and Post-Silicon Debug," 2024 IEEE Int'l Reliability Physics Symp. (IRPS), doi: 10.1109/IRPS48228.2024.10529312 (2024).

Chen et al., "Advance in detection of low sulfur content by wavelength dispersive XRF," Proceedings of the Annual ISA Analysis Division Symposium (2002).

Chen et al., "A Ray Tracing Survey of Asymmetric Operation of the X-ray Rowland Circle Using Spherically Bent Crystal Analyzers," arXiv:2409.13119v1 (2024).

Chinamatira et al., "X-ray phase contrast imaging: An alternative approach to laboratory-based sources," AFLS2024, contribution ID: 198 (2024).

Coan et al., "In vivo x-ray phase contrast analyzer-based imaging for longitudinal osteoarthritis studies in guinea pigs," Phys. Med. Biol. vol. 55(24) (2010), pp. 7649-7662.

Cohen et al., "Tunable laboratory extended x-ray absorption fine structure system," Rev. Sci. Instr. vol. 51, No. 3, Mar. 1980, pp. 273-277.

Costin et al., "Combining a Computed Laminography Approach with Tomographic Analysis for a Study of Weld Joints," 9th Conf. on Ind. Comp. Tomography, Padova, Italy (iCT 2019), pp. 1-8 (2019).

David et al., "Hard X-ray phase imaging and tomography using a grating interferometer," Spectrochimica Acta Part B vol. 62 (2007) pp. 626-630.

Davis et al., "Bridging the Micro-to-Macro Gap: A New Application for Micro X-Ray Fluorescence," Microsc. Microanal., vol. 17(3) (Jun. 2011), pp. 410-417.

De Pauw et al., "A review of laboratory, commercially available, and facility based wavelength dispersive X-ray fluorescence spectrometers," J. Anal. At. Spectrom., doi: 10.1039/d3ja00315a (2023).

Detlefs et al., "Fast Chemical Contrast by X-ray Fluorescence Intensity Ratio Detection," Anal. Chem., https://doi.org/10.1021/acs.analchem.3c00623 (2023).

Dewulf et al., "Advances in the metrological traceability and performance of X-ray computed tomography," CIRP Annals—Manuf. Tech. vol. 00, 1-24 (2022).

Diaz et al., "Monte Carlo Simulation of Scatter Field for Calculation of Contrast of Discs in Synthetic |CDMAM Images," In: Digital Mammography, Proceedings 10th International Workshop IWDM 2010 (Springer Verlag, Berlin Heidelberg), (2010), pp. 628-635 (9 pages).

Dibernardo, "Non-disruptive techniques for depth profiling in photoemission spectroscopy," Nature Review Physics, https://doi.org/10.1038/s42254-021-00331-4 (2021).

Dittler et al., "A mail-in and user facility for X-ray absorption near-edge structure: the CEI-XANES laboratory X-ray spectrometer at University of Washington," J. Synch. Rad. vol. 26, eight pages, (2019).

Dong et al., "Improving Molecular Sensitivity in X-Ray Fluorescence Molecular Imaging (XFMI) of Iodine Distribution in Mouse-Sized Phantoms via Excitation Spectrum Optimization," IEEE Access, vol. 6, pp. 56966-56976 (2018).

Dreier et al., "Improved resolution in advanced packaging metrology through advanced nano-focus X-ray sources, " 2024 25th Int'l Conf. Elect. Packaging Tech. (ICEPT), doi: 10.1109/ICEPT63120.2024.10668783 (2024).

Dreier et al., "X-ray nano-tomography enabling sub-micron resolution failure analysis for advanced packaging," ISTFA 2024: Proc. From 50th Int'l Symp. For Testing and Failure Analysis Conf., https://doi.org/10.31399/asm.cp.istfa2024p0169 (2024).

Du et al., "Removal of artifacts caused by grating imperfections in X-ray phase contrast tomography," J. of Inst. vol. 16, P06039, doi.org/10.1088/1748-0221/16/06/P06039 (2021).

(56) References Cited

OTHER PUBLICATIONS

Erko et al., "X-ray Optics," Ch. 3 of "Handbook of Practical X-Ray Fluorescence Analysis," B. Beckhoff et al., eds. (Springer, Berlin, Germany, 2006), pp. 85-198.
Espes et al., "High-resolution X-ray source with advanced e-beam technology: pushing the resolution limitation for lab-scale NanoCT," Micros. Microanal., vol. 27 (Suppl. 1), pp. 1230 (2021).
Fahmi et al., "Biological applications of X-ray fluorescence microscopy: exploring the subcellular|topography and speciation of transition metals," Current Opinion in Chem. Bio. vol. 11, pp. 121-127 (2007).
Feng et al., "Reduction of Compton Background Noise for X-ray Fluorescence Computed Tomography with Deep Learning," Photonics, vol. 9, p. 108 (2022).
Fernández-Ruiz, "TXRF Spectrometry as a Powerful Tool for the Study of Metallic Traces in Biological Systems," Development in Analytical Chemistry, vol. 1 (2014), pp. 1-14.
Fisher et al., "Laminography in the lab: imaging planar objects using a conventional x-ray CT scanner," Meas. Sci. Technol., vol. 30, p. 035401 (2019).
Flenner et al., "Hard X-ray full-field nanoimaging using a direct photon-counting detector," J. Synch. Rad., https://doi.org/10.1107/S1600577522012103 (2022).
Flenner et al., "Dual-beam X-ray nano-holotomography," J. Synch. Rad., https://doi.org/10.1107/51600577524003801 (2024).
Fraunhofer, "High-resolution computed laminography (HRCL) for electronic components," https://www.ikts.fraunhofer.de/en/departments/electronics_microsystems_biomedicine/condition_monitoring_non-destructive_testing/ndt_test_lab/3D-X-ray_inspection_industrial_components/computed_laminography _printed_circuit_board_inspection.html, (2024).
Gaur et al., "On the method of calibration of the energy dispersive EXAFS beamline and Indus-2 and fitting theoretical model to the EXAFS spectrum," Sadhana, vol. 36, No. 3 pp. 3390348 (2011).
Ge et al., "Investigation of the partially coherent effects in a 2D Talbot interferometer," Anal. Bioanal. Chem. vol. 401, (2011), pp. 865-870.
Ge et al., "Self-absorption correction on 2D X-ray fluorescence maps," Sci. Rep. 13, p. 7271, https://doi.org/10.1038/s41598-023-33383-w (2023).
Ghani et al., "A Phase Sensitive X-ray Brest Tomosynthesis System: Preliminary Patient Images with Cancer Legions," Phys. Med. Biol. https://doi.org/10.1088/1361-6560/ac2ea6 (2021).
Gironda et al., "Asymmetric Rowland circle geometries for spherically bent crystal analyzers in laboratory and synchrotron applications," J. Anal. At. Spectrom., doi: 10.1039/d3ja00437f (2024).
Gobo et al., "Grating-based spatial harmonic frequency X-ray imaging for quantitative characterization of structures with sub-detector spatial resolution," Measurement, doi:10.1016/j.measurement.2024.115601 (2024).
Greczynski et al., "Binding energy referencing in X-ray photoelectron spectroscopy," Nature Reviews Mat'ls, doi.org/10.1038/s41578-024-00743-5 (2024).
Graetz et al., "Lenseless X-ray Nano-Tomography down to 150 nm Resolution: On the Quantification of Modulation Transfer and Focal Spot of the Lab-based ntCT System," arXiv:2009.11749v1 [physics.ins-det] Sep. 24, 2020, 10 pages.
Gu et al., "A Breakthrough in Resolution and Scan Speed: Overcome the Challenges of 3D X-ray Imaging Workflows for Electronics Package Failure Analysis," 2023 IEEE Int'l Symp. Phys. and Failure Analysis of Integrated Circuits (IPFA), doi: 10.1109/IPFA58228.2023.10249028 (2023).
Günther et al., "Full-field structured-illumination super-resolution X-ray transmission microscopy," Nature Comm. 10:2494 (2019) and supplementary information.
Gustschin et al., "High resolution and sensitivity bi-directional x-ray phase contrast imaging using 2D Talbot array illuminators," arXiv:2105.07347v1 [physics.med-ph] May 16, 2021.
Harasse et al., "X-ray Phase Laminography with Talbot Interferometer", in Developments in X-Ray Tomography VII, Proc. SPIE vol. 7804 (2010), 780411.
Harasse et al., "Iterative reconstruction in x-ray computed laminography from differential phase measurements", Opt. Express. vol. 19 (2011), pp. 16560-16573.
Harasse et al., "X-ray Phase Laminography with a Grating Interferometer using Iterative|Reconstruction", in International Workshop on X-ray and Neutron Phase Imaging with Gratings, AIP Conf. Proc. vol. 1466, (2012), pp. 163-168.
Hashimoto et al., "Improved reconstruction method for phase stepping data with stepping errors and dose fluctuations," Optics Express, vol. 28, No. 11, pp. 16363-16384 (2020).
Haug et al., "A laboratory-based multifunctional near ambient pressure X-ray photoelectron spectroscopy system for electrochemical, catalytic, and cryogenic studies," Rev. Sci. Instr. vol. 94, 065104, https://doi.org/10.1063/5.0151755 (2023).
Hayashi et al., "Wave-dispersive x-ray spectrometer for simultaneous acquisition of several characteristic lines based on strongly and accurately shaped Ge crystals," Rev. Sci. Instr. vol. 79, 033110 (2008).
Heirwegh et al., "The focused beam X-ray fluorescence elemental quantification software package PIQUANT," Spectrochimica Acta Part B: Atomic Spectroscopy, https://doi.org/10/1016/j.sab.2022.106520 (2022).
Helfen et al., "On the Implementation of computed laminography using synchrotron radiation", Rev. Sci. Instr. vol. 82, pp. 063702-1-063702-8 (2011).
Hemraj-Benny et al., "Near-Edge X-ray Absorption Fine Structure Spectroscopy as a Tool for Investigating Nanomaterials," Small, vol. 2(1), (2006), pp. 26-35.
Hennekam et al., "Trace metal analysis of sediment cores using a novel X-ray fluorescence core scanning method," Quaternary Int'l, https://doi.org/10.1016/j.quaint.2018.10.018 (2018).
Hirano et al., "X-ray zooming optics for analyzer-based multi-contrast computed tomography," J. Synch. Rad. vol. 29, https://doi.org/10.1107/S1600577522001412 (2022).
Holberg et al., "High-Resolution Table-Top NEXAFS Spectroscopy," Anal. Chem. https://10.1021/acs.analchem.1c04374 (2022).
Holden et al., "Probing Sulfur Chemical and Electronic Structure with Experimental Observation and Quantitative Theoretical Prediction of K# and Valence-to-Core K# X-ray Emission Spectroscopy," J. Phys. Chem. A doi: 10.1021/acs.jpca.0c04195 (2020).
Holfelder et al., "A double crystal von Hamos spectrometer for traceable x-ray emission spectroscopy," Rev. Sci. Instrum. vol. 92, p. 123105 (2021).
Hönlcke et al., "Reference-free X-ray fluorescence analysis with a micrometer-sized incident beam," Nanotechnology, https://doi.org/10.1088/1361-6528/ad3aff (2024).
Honma et al., Full-automatic XAFS Measurement System of the Engineering Science Research II beamline BL14B2 at Spring-8, 2011, AIP Conference Proceedings 1234, pp. 13-16.
Hoshino et al., "High-energy X-ray micro-laminography to visualize microstructures in dense planar object," J. Synch. Rad. https://doi.org/10.1107/S1600577522012176 (2022).
Hosseinzadeh et al., "Total-Ionizing-Dose Effects in Integrated Silicon Phase Shifters Using Localized X-Ray Pulses," IEEE Trans. Nucl. Sci., doi.org/10.1109/TNS.2024.3496297 (2024).
Howard et al., "High-Definition X-ray Fluorescence Elemental Mapping of Paintings," Anal. Chem., 2012, vol. 84(7), pp. 3278-3286.
Hu et al., "Improving small animal cone beam CT resolution by mitigating x-ray focal spot induced blurring via deconvolution," Phys. Med. Bio., in press, https://doi.org/10.1088/1361-6560/ac6b7a (2022).
Hui et al., "Stacked Scintillators Based Multispectral X-Ray Imaging Featuring Quantum-Cutting Perovskite Scintillators With 570 nm Absorption-Emission Shift," Adv. Mat'ls doi:10.1002/adma.202416360 (2025).
Ide-Ektessabi et al., "The role of trace metallic elements in neurodegenerative disorders: quantitative analysis using XRF and XANES spectroscopy," Anal. Sci., vol. 21(7) (Jul. 2005), pp. 885-892.

(56) References Cited

OTHER PUBLICATIONS

Inoue et al., "Monolithic deformable mirror based on lithium niobate single crystal for high-resolution X-ray adaptive microscopy," Optica, vol. 11, No. 5, pp. 621-625 (2024).
Ishisaka et al., "A New Method of Analyzing Edge Effect in Phase Contrast Imaging with Incoherent X-rays," Optical Review, vol. 7, No. 6, (2000), pp. 566-572.
Ito et al., "A Stable In-Laboratory EXAFS Measurement System," Jap. J. Appl. Phys., vol. 22, No. 2, Feb. 1, 1983, pp. 357-360.
Itoh et al., "Two-dimensional grating-based X-ray phase-contrast imaging using Fourier transform phase retrieval," Op. Express, vol. 19, No. 4 (2011) pp. 3339-3346.
Janssens et al, "Recent trends in quantitative aspects of microscopic X-ray fluorescence analysis," TrAC Trends in Analytical Chemistry 29.6 (Jun. 2010): 464-478.
Jahrman et al., "Vacuum formed temporary spherically and toroidally bent crystal analyzers for x-ray absorption and x-ray emission spectroscopy," Rev. Sci. Inst. vol. 90, 013106 (2019).
Jiang et al., "X-Ray Phase-Contrast Imaging with Three 2D Gratings," Int. J. Biomed. Imaging, (2008), 827152, 8 pages.
Kalasová et al., "Characterization of a laboratory-based X-ray computed nanotomography system for propagation-based method of phase contrast imaging," IEEE Trans. On Instr. And Meas., DOI 10.1109/TIM.2019.2910338 (2019).
Kang et al., "Cold Cathode Flat Panel X-ray Source for Talbot-Lau Grating Interferometer using Zinc Oxide Nanowire Field Emitter Arrays and Periodic Microstructured Anode," ACS Appl. Nano Mater., doi.org/10.1021/acsanm.4c04410 (2024).
Keyrilainen et al., "Phase contrast X-ray imaging of breast," Acta Radiologica, vol. 51 (8), (2010), pp. 866-884.
Khan et al., "Recent Trends in Applications of X-ray Photoelectron Spectroscopy (XPS) Technique in Coatings for Corrosion Protection," Chapter of "Recent Developments in Analytical Techniques for Corrosion Research," I. Toor (ed.), Springer Nature Switzerland AG https://doi.org/10.1007/978-3-030-89101-5_8 (2022).
Kido et al., "Bone Cartilage Imaging with X-ray Interferometry using a Practical X-ray Tube", in Medical Imaging 2010: Physics of Medical Imaging, Proc. SPIE vol. 7622 (2010), 762240.
Kim, "Talbot images of wavelength-scale amplitude gratings," Opt. Express vol. 20(5), (2012), pp. 4904-4920.
Kim et al., "Observation of the Talbot Effect at Beamline 6C Bio Medical Imaging of the Pohang Light Source-II," J. Korean Phys. Soc., vol. 74, No. 10, pp. 935-940 (May 2019).
Kim et al., "A Simulation Study on the Transfer Characteristics of the Talbot Pattern Through Scintillation Screens in the Grating Interferometer," J. Rad. Sci. and Tech. 42(1), pp. 67-75 (2019).
Kiranjot et al., "Surface and interface characterization of Ru/C/Ru trilayer structure using grazing incidence X-ray reflectivity and X-ray fluorescence," Surf. And Interface Analysis, doi: 10.1002/sia7016 (2021).
Kiyohara et al., "Development of the Talbot-Lau Interferometry System Available for Clinical Use", in International Workshop on X-ray and Neutron Phase Imaging with Gratings, AIP Cong. Proc. vol. 1466, (2012), pp. 97-102.
Klockenkämper et al., "7.1 Instrumental Developments" and "7.3 Future Prospects by Combinations," from Chapter 7 of Total Reflection X-ray Fluorescence Analysis and Related Methods 2nd Ed. (J. Wiley and Sons, Hoboken, NJ, 2015).
Klockenkämper et al., "Chapter 3: Instrumentation for TXRF and GI-XRF," Total Reflection X-ray Fluorescence Analysis and Related Methods 2nd Ed. (J. Wiley and Sons, Hoboken, NJ, 2015).
Kottler et al., "A two-directional approach for grating based differential phase contrast imaging using hard x-rays," Opt. Express vol. 15(3), (2007), pp. 1175-1181.
Kottler et al., "Dual energy phase contrast x-ray imaging with Talbot-Lau interferometer," J. Appl. Phys. vol. 108(11), (2010), 114906.
Kroupa et al., "High contrast laminography using iterative algorithms," 12th Int'l Workshop on Rad. Imag. Detectors, doi: 10.1088/1748-0221/6/01/C01045 (2010).
Kulow et al., "On the Way to Full-Field X-ray Fluorescence Spectroscopy Imaging with Coded Apertures," J. Anal. At. Spectrom. Doi: 10.1039/C9JA00232D (2019).
Kutukova et al., "Laboratory High-Contrast X-ray Microscopy of Copper Nanostructures Enabled by a Liquid-Metal-Jet X-ray Source," Nanomaterials, vol. 14, p. 448 (2024).
Kuwabara et al., "Hard-X-ray Phase-Difference Microscopy with a Low-Brilliance Laboratory X-ray Source", Appl. Phys. Express vol. 4 (2011) 062502.
Leatham et al., "X-ray dark-field and phase retrieval without optics, via the Fokker-Planck equation," arXiv:2122.10999v1, physics.med-ph, Dec. 21, 2021.
Lee et al., "A system design method for signal-to-noise ratio enhancement in single-grating-based X-ray phase-contrast imaging," Nucl. Eng. & Tech., doi: 10.1016/j.net.2025.103482 (2025).
Lei et al., "8-inch-diameter field of view for X-ray differential phase-contrast imaging," Nucl. Inst. And Methods in Physics Research A, https://doi.org/10-1016/j.nima.2021.165375 (2021).
Li et al., "X-ray phase-contrast imaging using cascade Talbot-Lau interferometers," Proc. SPIE 10964 (2018), pp. 1096469-1-1096469-6.
Liao et al., "Design of a full-filled transmission X-ray microscope with 30nm resolution," SPIE Proc. Publ., ChinaXiv:202311.00232v1 (2023).
Lin et al., "Quasi-Monte Carlo method for calculating X-ray scatter in CT," Op. Express, vol. 29, No. 9, p. 13746 (2021).
Lin et al., "High energy x-ray Talbot-Lau interferometer employing a microarray anode-structured target source to extend the field of view," Phys. Med. Biol., doi.org/10.1088/1361-6560/ad0196 (2023).
Lin et al., "A lab-based micro X-ray fluorescence spectrometer with high photon flux and spatial resolution for ancient ceramic research," J. Anal. At. Spectrom., doi: 10.1039/D4JA00319E (2025).
Linsen et al., "Single X-ray Projection Material Decomposition using a Mesh Projector," 14th Conf. Ind. Comp. Tomography, Antwerp, Belgium (iCT 2025) e-Journal of Nondestructive Testing, doi: 10.58286/30756 (2025).
Lohmann et al., "An interferometer based on the Talbot effect," Optics Communications vol. 2 (1971), pp. 413-415.
Longo et al., "Flexible Plenoptic X-ray Microscopy," Photonics, vol. 9, p. 98 (2022).
Lübcke et al., "Soft X-ray nanoscale imaging using a sub-pixel resolution charge coupled device (CCD) camera," Rev. Sci. Instrum. vol. 90, 043111 (2019).
Lucht et al., "Phase retrieval beyond the homogeneous object assumption for X-ray in-line holographic imaging," arXiv:2403.00461v1 [eess.IV] (2024).
Lühl et al., "Scanning transmission X-ray microscopy with efficient X-ray fluorescence detection (STXM-XRF) for biomedical applications in the soft and tender energy range," J. Synch. Rad. vol. 26, https://doi.org/10.1107/S1600577518016879, (2019).
Ma et al., "Exploration and Research of High Contrast and High Resolution Two-dimensional X-Ray Grids," Sixth Conf. Frontiers in Op. Imaging and Tech., Proc. SPIE vol. 13153, doi: 10.1117/12.3014459 (2024).
Maisl et al., "Computed Laminography for X-ray Inspection of Lightweight Constructions," 2nd Int'l Symp. On NDT in Aerospace 2010—Mo.3.A.3, https://www.ndt.net/?id+10375 (2010).
Mäkinen et al., "Optimization of contrast and dose in X-ray phase-contrast tomography with a Talbot-Lau interferometer," Biomed. Phys. Eng. Express, doi: 10.1088.2057-1976/ad5206 (2024).
Malzer et al., "A laboratory spectrometer for high throughput X-ray emission spectroscopy in catalysis research," Rev. Sci. Inst. 89, 113111 (2018).
Mamyrbayev et al., "Staircase array of inclined refractive multi-lenses for large field of view pixel super-resolution scanning transmission hard X-ray microscopy," J. Synch. Rad., vol. 28 https://doi.org/10.1107/S1600577521001521 (2021).
Masteghin et al., "Benchmarking of X-Ray Fluorescence Microscopy with Ion Beam Implanted Samples Showing Detection Sensitivity of Hundreds of Atoms," Small Methods, doi: 10.1002/smtd.202301610 (2024).

(56) References Cited

OTHER PUBLICATIONS

Matsunaga et al., “Development of projection X-ray microscope with 10 nm spot size,” Nodestr. Test. And Eval., https://doi.org.10.1080/10589759.2022.2083616 (2022).
Matsuyama et al., “Wavefront measurement for a hard-X-ray nanobeam using single-grating interferometry”, Opt. Express vol. 20 (2012), pp. 24977-24986.
Matveevskii et al., “Laboratory-based 3D X-ray standing-wave analysis of nanometre-scale gratings,” J. Appl. Crystallography, vol. 57, doi.org/10.1107/S1600576724007179 (2024).
McRae et al., “In Situ Imaging of Metals in Cells and Tissues,” Chem Rev. vol. 109, doi:10.1021/cr900223a (2009).
Menzies et al., “Dual source X-ray and electron SEM system: Elemental mapping of an Epithermal gold-bearing sample from Karangahake, New Zealand,” Microsc. Microanal., vol. 27 (Suppl. 1), pp. 456 (2021).
Miao et al., “Motionless phase stepping in X-ray phase contrast imaging with a compact source,” Proceedings of the National Academy of Sciences, vol. 110(48), (2013), pp. 19268-19272.
Miao et al., “A four-grating interferometer for x-ray multi-contrast imaging,” Med. Physics, doi: 10.1002/mp.17052 (2024).
Mijovilovich et al., “Analysis of trace metal distribution in plants with lab-based microscopic X-ray fluorescence imaging,” Plant Methods, vol. 16, No. 82, 21 pages (2020).
Mizutani et al., X-ray microscopy for neural circuit reconstruction in 9th International Conference on X-Ray Microscopy, J. Phys: Conf. Ser. 186 (2009) 012092.
Modregger et al., “Grating-Based X-ray Phase Contrast Imaging,” Ch. 3 of Emerging Imaging Technologies in Medicine, M. Anastasio & P. La Riviere, ed., CRC Press, Boca Raton, FL, (2012), pp. 43-56.
Momose et al., “Phase-Contrast X-Ray Imaging Using an X-Ray Interferometer for Biological Imaging”, Analytical Sciences vol. 17 Supplement (2001), pp. i527-i530.
Momose et al., “Demonstration of X-Ray Talbot Interferometry”, Jpn. J. Appl. Phys. vol. 42 (2003), pp. L866-L868.
Momose et al., “Phase Tomography Using an X-ray Talbot Interferometer”, in Developments in X-Ray Tomography IV, Proc. SPIE vol. 5535 (2004), pp. 352-360.
Momose, “Recent Advances in X-ray Phase Imaging”, Jpn. J. Appl. Phys. vol. 44 (2005), pp. 6355-6367.
Momose et al., “Biomedical Imaging by Talbot-Type X-Ray Phase Tomography” in Developments in X-Ray Tomography V, Proc. SPIE vol. 6318 (2006) 63180T.
Momose et al., “Phase Tomography by X-ray Talbot Interferometry for Biological Imaging” Jpn. J. Appl. Phys. vol. 45 2006 pp. 5254-5262.
Momose et al., “X-ray Talbot Interferometry with Capillary Plates”, Jpn. J. Appl. Phys. vol. 45 (2006), pp. 314-316.
Momose et al., “Phase Imaging with an X-ray Talbot Interferometer”, Advances in X-ray Analysis vol. 49(3) (2006), pp. 21-30.
Momose et al., “Phase Tomography Using X-ray Talbot Interferometer”, in Synchrotron Radiation Instrumentation: Ninth International Conference, AIP Conf. Proc. vol. 879 (2007), pp. 1365-1368.
Momose et al., “Sensitivity of X-ray Phase Imaging Based on Talbot Interferometry”, Jpn. J. Appl. Phys. vol. 47 (2008), pp. 8077-8080.
Momose et al., “Grating-Based X-ray Phase Imaging Using Multiline X-ray Source”, Jpn. J. Appl. Phys. vol. 48 (2009), 076512.
Momose et al., “X-ray phase tomography with a Talbot interferometer in combination with an X-ray imaging microscope”, in 9th International Conference on X-Ray Microscopy, J. Phys: Conf. Ser. 186 (2009) 012044.
Momose et al., “High-speed X-ray phase imaging and X-ray phase tomography with Talbot interferometer and white synchrotron radiation”, Opt. Express vol. 17 (2009), pp. 12540-12545.
Momose et al., “X-Ray Phase Imaging with Talbot Interferometry”, in “Biomedical Mathematics:|Promising Directions in Imaging, Therapy Planning, and Inverse Problems”, Y. Censor, M. Jiang & G. Wang, eds. (Medical Physics Publishing, Madison, WI, USA, 2010), pp. 281-320.
Momose et al., “X-ray Phase Measurements with Talbot Interferometry and Its Applications”, inInternational Conference on Advanced Phase Measurement Methods in Optics and Imaging, AIP Conf. Proc. vol. 1236 (2010), pp. 195-199.
Momose et al., “X-ray Phase Imaging Using Lau Effect”, Appl. Phys. Express vol. 4 (2011) 066603.
Momose et al., “Four-dimensional X-ray phase tomography with Talbot interferometry and white synchrotron radiation: dynamic observation of a living worm”, Opt. Express vol. 19 (2011), pp. 8423-8432.
Momose et al., “X-ray Phase Imaging—From Static Observation to Dynamic Observation—”, in International Workshop on X-ray and Neutron Phase Imaging with Gratings AIP Conf. Proc. vol. 1466, (2012), pp. 67-77.
Momose et al., “Recent Progress in X-ray and Neutron Phase Imaging with Gratings, ” Quantum Beam Science, vol. 4, No. 9; doi:10.3390/qubs4010009 (2020).
Momose et al., “Development of grating-based super-resolution x-ray phase imaging,” AIP Conf. Proc. 2990, 030003 (2023).
Momose et al., “Signal enhancement in X-ray Talbot interferometry with a pair of concave and convex parabolic phase gratings,” Appl. Phys. Express, doi.org/10.35848/1882-0786/ad9665 (2024).
Morimoto et al., “X-ray phase contrast imaging by compact Talbot-Lau interferometer with a signal transmission grating,” 2014, Optics Letters, vol. 39, No. 15, pp. 4297-4300.
Morimoto et al., “Design and demonstration of phase gratings for 2D single grating interferometer,” Optics Express vol. 23, No. 23, 29399 (2015).
Morvay, “Chemical composition depth profiling of thin films using x-ray reflectometry and fluorescence,” Ph.D. thesis, Masaryk University, Brno, Czech Republic (2024).
Munro et al., Design of a novel phase contrast imaging system for mammography, 2010, Physics in Medicine and Biology, vol. 55, No. 14, pp. 4169-4185.
Nakamura et al., “Nanoscale X-ray Tomography of Integrated Circuits using a Hybrid Electron/X-ray Microscope: Results and Prospects,” 2023 IEEE Phys. Assurance and Inspection of Electron., doi: 10.1109/PAINE58317.2023.10318004 (2023).
Nango et al., “Talbot-defocus multiscan tomography using the synchrotron X-ray microscope to study the lacuno-canalicular network in mouse bone”, Biomed. Opt. Express vol. 4 (2013), pp. 917-923.
Nemeth et al., “Laboratory von Hamos X-ray Spectroscopy for Routine Sample Characterization,” arvix:1607.08045v1 (2016).
Neuhausler et al., “Non-destructive high-resolution X-ray imaging of ULSI micro-electronics using keV X-ray microscopy in Zernike phase contrast,” Microelectronic Engineering, Elsevier Publishers BV., Amsterdam, NO, vol. 83, No. 4-9 (Apr. 1, 2006) pp. 1043-1046.
Newville, “Fundamentals of XAFS,” (Univ. of Chicago, Chicago, IL, Jul. 23, 2004).
Nguyen et al., “Data-Efficient Deep Learning for Printed Circuit Board Defect Detection Using X-Ray Images,” J. IEEE vol. 14, No. 8, pp. 1-14 (2021).
Novichkov et al., “Laboratory-based X-ray spectrometer for actinide science,” J. Synch. Rad. vol. 30, doi.org/10.1107/S1600577523006926 (2023).
Nykanen et al., “X-ray scattering in full-field digital mammography,” Med. Phys. vol. 30(7), (2003), pp. 1864-1873.
O’Brien et al., “Recent Advances in X-ray Cone-beam Computed Laminography,” J. X-ray Sci. and Tech., vol. 24, No. 5, pp. 691-707 (2016).
Ohba et al., “Laboratory-size x-ray microscope using Wolter mirror optics and an electron-impact x-ray source,” Rev. Sci. Inst. 92, 093704 (2021).
Oji et al., Automatic XAFS measurement system developed at BL14B2 in SPring-8, Available online Nov. 15, 2011, Journal of Synchrotron Radiation, vol. 19, pp. 54-59.
Okolo, “A guide into the world of high-resolution 3D imaging: the case of soft X-ray tomography for the life sciences,” Biochem. Soc. Trans., https://doi.org/10.1042/BST20210886 (2002).

(56) References Cited

OTHER PUBLICATIONS

Olbinado et al., "Demonstration of Stroboscopic X-ray Talbot Interferometry Using Polychromatic Synchrotron and Laboratory X-ray Sources", Appl. Phys. Express vol. 6 (2013), 096601.
Ortega et al., "Bio-metals imaging and speciation in cells using proton and synchrotron radiation X-ray microspectroscopy," J. Royal Society Interface vol. 6 suppl. 5 (Oct. 6, 2009), pp. 6S649-58.
Pandeshwar et al., "Envelope modulated x-ray grating interferometry," Appl. Phys. Lett. 120, 193701 (2022).
Pandeshwar et al., "Modeling of beam hardening effects in a dual-phase X-ray grading|interferometer for quantitative dark-field imaging," Optics Express, vol. 28, No. 13, Jun. 22, 2020, pp. 19187-19204 (2020).
Parrill et al., "GISAXS—Glancing Incidence Small Angle X-ray Scattering," Journal de Physique IV, vol. 3 (Dec. 1993), pp. 411-417.
Pasikatan, "Characterization and measurement limitations using non-destructive mueller matrix scatterometry (MMSE) and x-ray diffraction (xXRD) techniques for gate all around (GAA) transistor test structures: Limitations and superlattice effects in advanced Si/Si(1-x)Ge(x) superlattice nanowire test structures and measureability of simulated horizontal GAA test structures," Electronic Theses & Dissertations (2024-present), 109 (2024).
Paunesku et al., "X-Ray Fluorescence Microprobe Imaging in Biology and Medicine," J. Cell. Biochem. vol. 99, pp. 1489-1502 (2006).
Pekel et al., "Geometric calibration of seven degree of freedom robotic sample holder for x-ray CT," Proc. Of SPIE 12304, 7th Int'l Conf. on Image Formation in X-Ray Computed Tomography, 123042L, doi:10.1117/12.2646492 (2022).
Perez et al., "Phase Contrast Based High Resolution X-Ray Desktop Tomography," Rad. Phys. and Chem. Doi: 10.1016/j.radphyschem.2025.112600 (2025).
Pfeiffer et al., "Phase retrieval and differential phase-contrast imaging with low-brilliance X-ray sources," Nature Physics vol. 2, (2006), pp. 258-261.
Pfeiffer et al., "Hard x-ray phase tomography with low brilliance x-ray sources," Phys. Rev. Lett. vol. 98, (2007), 108105.
Pfeiffer et al., " Hard-X-ray dark-field imaging using a grating interferometer," Nature Materials vol. 7, (2008), pp. 134-137.
Pfeiffer, "Milestones and basic principles of grating-based x-ray and neutron phase-contrast imaging," in International Workshop on X-ray and Neutron Phase Imaging with Gratings AIP Conf. Proc. vol. 1466, (2012), pp. 2-11.
Pianetta et al., "Application of synchrotron radiation to TXRF analysis of metal contamination on silicon wafer surfaces," Thin Solid Films, vol. 373(1-2), 2000, pp. 222-226.
Pieper et al., "Total-Ionizing Dose Damage from X-Ray PCB Inspection Systems," 2024 IEEE Int'l Reliability Physics Symp. (IRPS), doi: 10.1109/IRPS48288.2024.10529337 (2024).
Potts, "Electron Probe Microanalysis", Ch. 10 of "A Handbook of Silicate Rock Analysis" (Springer Science + Business Media, New York, 1987), pp. 326-382.
Prewett et al., "Focused ion beam repair: staining of photomasks and reticles," J. Phys. D Appl. Phys. vol. 26 (1993), pp. 1135-1137.
Prewett et al., "Gallium Staining in FIB Repair of Photomasks, " Microelectronic Engineering, vol. 21 (1993), pp. 191-196.
Prewett et al., "FIB Repair of 5X Reticles and Effects on IC Quality," Integrated Circuit Metrology, Inspection, and Process Control VII, Proc. SPIE vol. 1926 (1993), pp. 517-526.
Pushie et al., "Prion protein expression level alters regional copper, iron and zinc content in the mouse brain," Metallomics vol. 3, 206-214 (2011).
Pushie et al., "Elemental and Chemically Specific X-ray Fluorescence Imaging of Biological Systems," Chem. Rev. 114:17, 8499-8541 (2014).
Qiao et al., "Single-shot x-ray phase-contrast and dark-field imaging based on coded binary phase mask," Appl. Phys. Lett. 119, 011105 (2021).
Qin et al., "Trace metal imaging with high spatial resolution: Applications in biomedicine," Metallomics, vol. 3 (Jan. 2011), pp. 28-37.
Redus et al., "Spectrometer configuration and measurement uncertainty in X-ray spectroscopy," X-Ray Spectrom., pp. 1-14 (2020).
Renaud et al., "Probing surface and interface morphology with Grazing Incidence Small Angle X-ray Scattering," Surface Science Reports, vol. 64:8 (2009), pp. 255-380.
Rix et al., "Super-Resolution X-ray phase-contrast and dark-field imaging with a single 2D grating and electromagnetic source stepping," Phys. Med. Biol. In press https://doi.org/10.1088/1361-6560/ab2ff5 (2019).
Roter et al., "Multifunctional bending magnet beamline with a capillary optic for X-ray fluorescence studies of metals in tissue sections," doi: 10.1101/2025.01.18.633695 (2025).
Rutishauser, "X-ray grating interferometry for imaging and metrology," 2003, Eth Zurich, Diss. ETH No. 20939.
Sato et al., Two-dimensional gratings-based phase-contrast imaging using a conventional x-ray tube, 2011, Optics Letters, vol. 36, No. 18, pp. 3551-3553.
Scherer et al., "Bi-Directional X-Ray Phase-Contrast Mammography," PLoS ONE, vol. 9, Issue 5 (May 2014) e93502.
Scholze et al., "X-ray Detectors and XRF Detection Channels," Ch. 4 of "Handbook of Practical X-Ray Fluorescence Analysis," B. Beckhoff et al., eds. (Springer, Berlin Heidelberg, Germany, 2006), pp. 85-198.
Schunck et al., "Soft x-ray imaging spectroscopy with micrometer resolution," Optica vol. 8, No. 2, pp. 156-160 (2021).
Seddon-Ferretti et al., "HERMES—a GUI-based software tool for pre-processing of X-ray absorption spectroscopy data from laboratory Rowland circle spectrometers," J. Synch. Rad., vol. 29, https://doi.org/10.1107/S1600577521012583, pp. 1-4 (2022).
Sefi et al., "25-Fold Resolution Enhancement of X-ray Microscopy Using Multipixel Ghost Imaging," arXiv:2402.14023 (2024).
Seifert et al., "Talbot-Lau x-ray phase-contrast setup for fast scanning of large samples," Sci. Rep. 9:4199, pp. 1-11 (2019).
Shafkat et al., "Assessing Compatibility of Advanced IC Packages to X-Ray Based Physical Inspection," Elec. Device Failure Analysis, vol. 26, No. 3, pp. 14-24 (2024).
Shi et al., "Laboratory X-ray interferometry imaging with a fan-shaped source grating," Optics Lett., doi.org/10.1364/OL.426867 (2021).
Shimamura et al., "Soft X-ray nanobeams formed by aberration-reduced elliptical mirrors with large numerical aperture," Opt. Express, vol. 31, No. 23, 38132 (2023).
Shimura et al., "Hard x-ray phase contrast imaging using a tabletop Talbot-Lau interferometer with multiline embedded x-ray targets", Opt. Lett. vol. 38(2) (2013), pp. 157-159.
Simionovici et al., "X-ray focusing methods for X-ray absorption spectroscopy," Int'l Tables Crystallog. vol. I, https://doi.org/10.1107/S1574870721006844 (2022).
Six et al., "Joint multi-contrast CT for edge illumination X-ray phase contrast imaging using split Barzilai-Borwein steps," Op. Express, vol. 32, No. 2, pp. 1135-1150 (2024).
Soltau et al., "Coherent Diffractive Imaging with Diffractive Optics," Phys. Rev. Lett. 128, 223901 (2022).
Sparks Jr., "X-ray Fluorescence Microprobe for Chemical Analysis," in Synchrotron Radiation Research, H. Winick & S. Doniach, eds. (Plenum Press, New York, NY 1980), pp. 459-512.
Stampanoni et al., "The First Analysis and Clinical Evaluation of Native Breast Tissue Using Differential Phase-Contrast Mammography," Investigative Radiology, vol. 46, pp. 801-806. pub 2011-12-xx.
Storm et al., "Optimizing the energy bandwidth for transmission full-field X-ray microscopy experiments," J. Synch. Rad., vol. 29, https://doi.org/10.1107/S1600577521011206, pp. 1-10 (2022).
Streli et al., "Micro-X-ray fluorescence spectroscopy," Chapter 1.9.f of "Imaging Modalities for Biological and Preclinical Research: A compendium, vol. 1, Part I: Ex vivo biological imaging," Ed. Walter et al., 8 pages, doi:10.1088/978-0-7503-3059-6ch42 (2021).
Su et al., "Quantitative Dual-Energy X-ray Imaging Based on K-Edge Absorption Difference," J. Phys. Chem. Lett. vol. 14, pp. 10074-10079 (2023).

(56) References Cited

OTHER PUBLICATIONS

Sunday et al., "X-ray Metrology for the Semiconductor Industry Tutorial," J. Res. Nat'l Inst. Stan. vol. 124: 124003 (2019); https://doi.org/10.6028/jres.124.003.
Takeda et al., "X-Ray Phase Imaging with Single Phase Grating", Jpn. J. Appl. Phys. vol. 46 (2007), pp. L89-L91.
Takeda et al., "Differential Phase X-ray Imaging Microscopy with X-ray Talbot Interferometer" Appl. Phys. Express vol. 1 (2008) 117002.
Talbot, "Facts relating to optical science No. IV," Philos. Mag. vol. 9 (1836), pp. 401-407.
Tanaka et al., "Cadaveric and in vivo human joint imaging based on differential phase contrast by X-ray Talbot-Lau interferometry", Z. Med. Phys. vol. 23 (2013), pp. 222-227.
Tanaka et al., "Propagation-based phase-contrast imaging method for full-field X-ray microscopy using advanced Kirkpatrick-Baez mirrors," Op. Express vol. 31, No. 16, pp. 26135-26144 (2023).
Tang et al., "Detailed analysis of the interference patterns measured in lab-based X-ray dual-phase grating interferometry through wave propagation simulation," Opt. Ex. vol. 31, No. 2, pp. 1677-1691 (2023).
Tao et al., "Moire artifacts reduction in Talbot-Lau X-ray phase contrast imaging using a three-step iterative approach," Opt. Ex. vol. 30, No. 20, pp. 35096-35111 (2022).
Tao et al., "Factors Affecting the Spatial Resolution in 2D Grating-Based X-Ray Phase Contrast Imaging," Frontiers in Physics, doi: 10.3389/fphy.2021.672207 (2021).
Taphorn et al., "Grating-based spectral X-ray dark-field imaging for correlation with structural size measures," Sci. Reports, vol. 10, 13195 (2020).
Tebina et al., "X-Ray Fault Injection: Reviewing Defensive Approaches from a Security Perspective,"|2022 IEEE Int'l Symp. Defect and Fault Tolerances in VLSI and Nanotechnology Systems (DFT), doi: 10.1109/DFT56152.2022.9962362 (2022).
Terzano et al., Recent advances in analysis of trace elements in environmental samples by X-ray based techniques (IUPAC Technical Report), Pure Appl. Chem. 2019.
Tessarini et al., "Semi-classical Monte Carlo algorithm for the simulation of X-ray grating interferometry," Sci. Rep. vol. 12, p. 2485 (2022).
Tetef et al., "Unsupervised Machine Learning for Unbiased Chemical Classification in X-ray Absorption Spectroscopy and X-ray Emission Spectroscopy," Royal Soc. of Chem. Doi: 10.33774/chemrxiv-2021-5tvrv (2021).
Titus et al., "Advancing the in-situ characterization of light elements via X-ray absorption spectroscopy using superconducting detectors," Microsc. Microanal., vol. 27, (Suppl. 1), pp. 2890 (2021).
Tkachuk et al., "High-resolution x-ray tomography using laboratory sources", in Developments in X-Ray Tomography V, Proc. SPIE 6318 (2006): 631810.
Tkachuk et al., "Multi-length scale x-ray tomography using laboratory and synchrotron sources", Microsc. Microanal. vol. 13 (Suppl. 2) (2007), pp. 1570-1571.
Töpperwien et al., "Multiscale x-ray phase-contrast tomography in a mouse model of transient focal cerebral ischemia," Biomed. Op. Express, vol. 10, No. 1, Jan. 2019, pp. 92-103.
Tsuji et al., "X-Ray Spectrometry: Recent Technological Advances," John Wiley & Sons Ltd. Chichester, West Sussex, UK 2004), Chapters 1-7.
Udagawa, "An Introduction to In-House EXAFS Facilities," The Rigaku Journal, vol. 6, (1) (1989), pp. 20-27.
Udagawa, "An Introduction to X-ray Absorption Fine Structure," The Rigaku Journal, vol. 11(2)(1994), pp. 30-39.
Uehara et al., "Effectiveness of X-ray grating interferometry for non-destructive inspection of packaged devices", J. Appl. Phys. vol. 114 (2013), 134901.
Viermetz et al., "High resolution laboratory grating-based X-ray phase-contrast CT," Scientific Reports 8:15884 (2018).
Vila-Comamala et al., "High sensitivity X-ray phase contrast imaging by laboratory grating-based interferometry at high Talbot order geometry," Op. Express vol. 29, No. 2, pp. 2049-2064 (2021).
Villarraga-Gómez et al., "Assessing Electronic Devices with Advanced 3D X-ray Imaging and Electron Microscopy" (2023).
Villarraga-Gómez et al., "Assessing Electronics with Advanced 3D X-ray Imaging Techniques, Nanoscale Tomography, and Deep Learning," J. Fail. Anal. And Preven., https://doi.org/10.1007/s11668-024-01989-5 (2024).
Vogt, "X-ray Fluorescence Microscopy: A Tool for Biology, Life Science and Nanomedicine," Presentation on May 16, 2012 at James Madison Univ., Harrisonburg, VA (31 slides), 2012.
Wan et al., "Fabrication of Multiple Slit Using Stacked-Sliced Method for Hard X-ray Talbot-Lau Interferometer", Jpn. J. Appl. Phys. vol. 47 (2008), pp. 7412-7414.
Wang et al., "Advantages of intermediate X-ray energies in Zernike phase contrast X-ray microscopy," Biotech. Adv., vol. 31 (2013) pp. 387-392.
Wang, "Recent advances in X-ray grating-based dark-field imaging," Trends in Analytical Chemistry, doi.org/10.1016/j.trac.2024.118052 (2024).
Watanabe et al., "X-ray fluorescence micro-tomography and laminography using an x-ray scanning microscope," J. Phys: Conf. Series 186, 012022 (2009).
Watts et al., "The development of laboratory-based high energy sources for XPS," Surf. Interface Anal., pp. 1-17, doi:10.1002/sia.7300 (2023).
Weitkamp et al., "Hard X-ray phase imaging and tomography with a grating interferometer," Proc. SPIE vol. 5535, (2004), pp. 137-142.
Weitkamp et al., "X-ray phase imaging with a grating interferometer," Opt. Express vol. 13(16), (2005), pp. 6296-6304.
Weitkamp et al., "X-ray wavefront analysis and optics characterization with a grating interferometer," Appl. Phys. Lett. vol. 86, (2005), 054101.
Weitkamp et al., Tomography with grating interferometers at low-brilliance sources, 2006, SPIE, vol. 6318, pp. 0S-1 to 0S-10.
Weitkamp et al., "X-ray wavefront diagnostics with Talbot interferometers," International Workshop on X-Ray Diagnostics and Scientific Application of the European XFEL, Ryn, Poland, (2010), 36 slides.
Weitkamp et al., "Design aspects of X-ray grating interferometry," in International Workshop on X-ray and Neutron Phase Imaging with Gratings AIP Conf. Proc. vol. 1466, (2012), pp. 84-89.
Wen et al., "Fourier X-ray Scattering Radiography Yields Bone Structural Information," Radiology, vol. 251 (2009) pp. 910-918.
Wen et al., "Single-shot x-ray differential phase-contrast and diffraction imaging using two-dimensional transmission gratings," Op. Lett. vol. 35, No. 12, (2010) pp. 1932-1934.
Wirtensohn et al., "The Dark Side of Transmission X-Ray Microscopy," arXiv:2403.18884v1 [physics.optics[ Mar. 27, 2024.
Wirtensohn et al., "Nanoscale dark-field imaging in full-field transmission X-ray microscopy," Optica vol. 11, No. 6, doi.org/10.1364/optica.524812 (2024).
Wilde et al., "Modeling of an X-ray grating-based imaging interferometer using ray tracing," Op. Express vol. 28, No. 17, p. 24657 (2020).
Wilde et al., "Statistical optics modeling of dark-field scattering in X-ray grating interferometers: Part 1. Theory," Op. Express vol. 29, No. 25, p. 40891 (2021).
Wilde et al., "Statistical optics modeling of dark-field scattering in X-ray grating interferometers: Part 2. Simulation," Op. Express vol. 29, No. 25, p. 40917 (2021).
Withers et al., "X-ray computed tomography," Nature Reviews | Methods Primers, vol. 1, No. 18, pp. 1-21 (2021).
Witte et al., "From 2D STXM to 3D Imaging: Soft X-ray Laminography of Thin Specimens," Nano Lett. vol. 20, pp. 1305-1314 (2020).
Wittry et al., "Properties of fixed-position Bragg diffractors for parallel detection of x-ray spectra," Rev. Sci. Instr. vol. 64, pp. 2195-2200 (1993).
Wobrauschek et al., "Micro XRF of light elements using a polycapillary lens and an ultra-thin window Silicon Drift Detector inside a

(56) References Cited

OTHER PUBLICATIONS vacuum chamber," 2005, International Centre for Diffraction Data 2005, Advances in X-ray Analysis, vol. 48, pp. 229-235.
Wobrauschek et al., "Energy Dispersive, X-Ray Fluorescence Analysis," Encyclopedia of Analytical Chemistry, R.A. Meyers, Ed. (Wiley 2010).
Woicik et al., "Soft X-ray absorption spectra," Int. Tables Crystallogr. vol. 1, https://doi.org.10.1107/51574870720008484 (2023).
Xiao et al., "TXM-Sandbox: an open-source software for transmission X-ray microscopy data analysis," J. Synch. Rad., vol. 29, https://doi.org/10.1107/S1600577521011978, p. 1-10 (2022).
Xu et al., "Synchrotron radiation computed laminography for polymer composite failure studies," J. Synch. Rad., vol. 17, pp. 222-226 (2010).
Xu et al., "Comparison of image quality in computed laminography and tomography," Op. Express, vol. 20, No. 2, pp. 794-806 (2012).
Xu et al., "A versatile high-speed x-ray microscope for sub-10 nm imaging," Rev. Sci. Instr. vol. 95, p. 113705, doi.org/10.1063/5.0225904 (2024).
Yamada et al., "Compact full-field hard x-ray microscope based on advanced Kirkpatrick-Baez mirrors," Optica, vol. 7, No. 4 pp. 367-370 (2020).
Yang et al., "Non-linear super-resolution computed tomography imaging algorithm based on a discrete X-ray source focal spot model," Op. Express, vol. 32, No. 25, pp. 44452-44477 (2024).
Yashiro et al., "Optimal Design of Transmission Grating for X-ray Talbot Interferometer", Advances in X-ray Analysis vol. 49(3) (2006), pp. 375-379.
Yashiro et al., "Efficiency of capturing a phase image using cone-beam x-ray Talbot interferometry", J. Opt. Soc. Am. A vol. 25 (2008), pp. 2025-2039.
Yashiro et al., "Hard-X-Ray Phase-Difference Microscopy Using a Fresnel Zone Plate and a Transmission Grating", Phys. Rev. Lett. vol. 103 (2009), 180801.
Yashiro et al., "Hard x-ray phase-imaging microscopy using the self-imaging phenomenon of a transmission grating", Phys. Rev. A vol. 82 (2010), 043822.
Yashiro et al., "On the origin of visibility contrast in x-ray Talbot interferometry", Opt. Express (2010), pp. 16890-16901.
Yashiro et al., "X-ray Phase Imaging Microscopy using a Fresnel Zone Plate and a Transmission Grating", in The 10th International Conference on Synchrotron Radiation Instrumentation, AIP Conf. Proc. vol. 1234 (2010), pp. 473-476.
Yashiro et al., "Distribution of unresolvable anisotropic microstructures revealed in visibility-contrast images using x-ray Talbot interferometry", Phys. Rev. B vol. 84 (2011), 094106.
Yashiro et al., "X-ray Phase Imaging and Tomography Using a Fresnel Zone Plate and a Transmission Grating", in "The 10th International Conference on X-ray Microscopy Radiation Instrumentation", AIP Conf. Proc. vol. 1365 (2011) pp. 317-320.
Yashiro et al., "Theoretical Aspect of X-ray Phase Microscopy with Transmission Gratings" in International Workshop on X-ray and Neutron Phase Imaging with Gratings, AIP Conf. Proc. vol. 1466, (2012), pp. 144-149.
Yoshioka et al., "Imaging evaluation of the cartilage in rheumatoid arthritis patients with an x-ray phase imaging apparatus based on Talbot-Lau interferometry," Scientific Reports, 10:6561, https://doi.org/10.1038/s41598-020-63155-9 (2020).
Yuan at al., "Micro X-ray fluorescence device based on monocapillary ellipsoidal lens for thin film thickness measurements," Nucl. Inst. Meth. Phys. Res. A, vol. 1058, p. 168923 (2024).
Zan et al., "High-resolution multicontrast tomography with an X-ray microarray anode-structured target source," PNAS, doi.org10.1073/pnas.2103126118 (2021).
Zanette et al., "Two-Dimensional X-Ray Grating interferometer," Phys. Rev. Lett. vol. 105 (2010) pp. 248102-1 248102-4.
Zeeshan et al., "In-house setup for laboratory-based x-ray absorption fine structure spectroscopy measurements," Rev. Sci. Inst. 90, 073105 (2019).
Zeng et al., "Glass Monocapillary X-ray Optics and Their Applications in X-Ray Microscopy," X-ray Optics and Microanalysis: Proceedings of the 20th International Congress, AIP Conf. Proc. vol. 1221, (2010), pp. 41-47.
Zeng et al., "Restoration of X-ray phase-contrast imaging based on generative adversarial networks," Sci. Rep. doi.org/10/1030/s41598-024-77937-y (2024).
Zhan et al., "A Lightweight Method for Detecting IC Wire Bonding Defects in X-ray Images," Micromachines, vol. 14, p. 1119, https://doi.org/10.3390/mi14061119 (2023).
Zhang et al., "Application of confocal X-ray fluorescence based on capillary X-ray optics in nondestructively measuring the inner diameter of monocapillary optics," Optics Comm. (2018) https://doi.org/10.1016/j.optcom.2018.11.064.
Zhang et al., "Measurement of the inner diameter of monocapillary with confocal X-ray scattering technology based on capillary X-ray optics," Appl. Opt. (Jan. 8, 2019), doc ID 351489, pp. 1-10.
Zhang et al., "Laboratory-scale X-ray absorption spectrometer with a cylindrical Johansson crystal analyzer," Nuclear Inst. And Methods in Physics Research, A (2023), doi: https://doi.org/10.1016/j.nima.2023.168067 (2023).
Zhang et al., "Hard X-ray projection imaging below 5 nm resolution," https://doi.org/10.21203/rs.3.rs-4093473/v1 (2024).
Zhang et al., "Fast and efficient hard X-ray projection imaging below 10 nm resolution," Op. Express, vol. 32, No. 17, pp. 30879-30897 (2024).
Zhang et al., "Virtual X-ray critical dimension metrology via Monte Carlo simulation," Op. Lett. vol. 49, No. 22, pp. 6569-6572 (2024).
Zhao et al., "X-ray wavefront sensing and optics metrology using a microfocus x-ray grating interferometer with electromagnetic phase stepping," Appl. Phys. Lett. 120, 181105 (2022).
Zhao et al., "Applications of the non-negative least-squares deconvolution method to analyze energy- dispersive x-ray fluorescence spectra," Appl. Op., vol. 62, No. 20, pp. 5556-5564 (2023).
Zhou et al., "X-ray wavefront characterization with grating interferometry using an x-ray microfocus laboratory source," Proceedings, vol. 11492, Advances in Metrology for X-Ray and EUV Optics IX; 114920Q, https://doi.org/10.1117/12.2576152 (2020).
Zhu et al., "Optical Wafer Defect Inspection at the 10 nm Technology Node and Beyond," 2022 Int. Extrem. Manuf. In press https://doi.org/10.1088/2631-7990/ac64d7 (2022).

* cited by examiner

FIG. 1C: (Prior Art)

The derivative of the angles of each patch of rays

The angle of rays produced by each patch of surface

SYSTEM AND METHOD FOR GENERATING A FOCUSED X-RAY BEAM

CLAIM OF PRIORITY

This application claims the benefit of priority to U.S. Provisional Appl. No. 63/554,062 filed Feb. 15, 2024, which is incorporated in its entirety by reference herein.

BACKGROUND

Field

This application relates generally to x-ray microbeam apparatuses and x-ray microprobe based systems.

Description of the Related Art

Systems for producing x-ray microbeams typically include an x-ray source and an x-ray focusing optic that receives some x-rays from the x-ray source and focuses the x-rays to a small spot. For many applications of such x-ray microbeams, important performance attributes include but are not limited to: small x-ray focus size, high flux density and/or total flux, achromaticity, and sufficiently large working distance (e.g., distance between the system to the focus). In particular, a small x-ray spot size on a sample (e.g., less than 10 microns; less than 3 micron; less than 300 nm) with high flux is often used for microanalytical applications, including microXRF, microXRD, and scanning x-ray microscopy.

However, there are various challenges to obtaining some or all of these attributes (e.g., high flux and small sample spot sizes) with a laboratory x-ray source due to low source brightness and challenges in producing x-ray focusing optics having a high source x-ray collection efficiency and a small point spread function. Axially (e.g., cylindrically) symmetric capillary x-ray focusing optics can provide high x-ray collection efficiencies although fabrication with small surface figure errors can be challenging. In particular, it can be difficult to produce x-ray focusing optics with a point spread function (PSF) smaller than the x-ray spot size to be used. Existing approaches to fabricating x-ray focusing optics have limitations to produce such small PSFs without significant degradation in yield and/or fabrication time (see, e.g., Sun et al., "A procedure for the characterization of monocapillary x-ray lenses as condensers for full-field transmission x-ray microscopes," Front. Phys. 10.821549 (2022); Zeng et al., "Ellipsoidal and parabolic glass capillaries as condensers for x-ray microscopes," Appl. Op. Vol. 47, No. 13, pp. 2376-2381 (2008); Huang et al., "Single-bounce monocapillaries for focusing synchrotron radiation: modeling, measurements and theoretical limits," J. Synch. Rad. Vol. 13, pp. 74-84 (2006)). These methods primarily involve "shaping" the interior of a focusing x-ray optic by locally heating regions of a glass capillary to soften and move the heated zones in a prescribed fashion, akin to extremely high precision glass blowing.

SUMMARY

In certain implementations, an apparatus comprises at least one x-ray source configured to generate x-rays and at least one capillary x-ray focusing optic configured to receive and focus at least some of the generated x-rays into a focused x-ray beam. The apparatus further comprises at least one x-ray optical component configured to receive the generated x-rays and/or the focused x-ray beam such that a focus size $\delta_1$ of the focused x-ray beam is smaller than a focus size $\delta_0$ of the focused x-ray beam without the at least one x-ray optical component.

In certain implementations, an apparatus comprises at least one x-ray source configured to generate x-rays and at least one capillary x-ray focusing optic configured to receive and focus at least some of the generated x-rays into a focused x-ray beam. The apparatus further comprises at least one x-ray optical component configured to receive the generated x-rays and/or the focused x-ray beam such that a collective point spread function (PSF) of the at least one x-ray focusing optic and the at least one x-ray optical component is below 1 micron.

BRIEF DESCRIPTION OF THE DRAWINGS

FIG. 1C schematically illustrates an example prior art system without the at least one x-ray optical component.

DETAILED DESCRIPTION

Certain implementations described herein provides an x-ray microbeam apparatus comprising a capillary x-ray focusing optic mirror and an x-ray optical component configured to correct at least some figure errors of the capillary x-ray focusing optic to achieve a small x-ray source focus (e.g., submicron focus) with high x-ray flux density. In particular, certain implementations comprise a small point spread function (PSF) x-ray focusing optics.

Figure 1B:
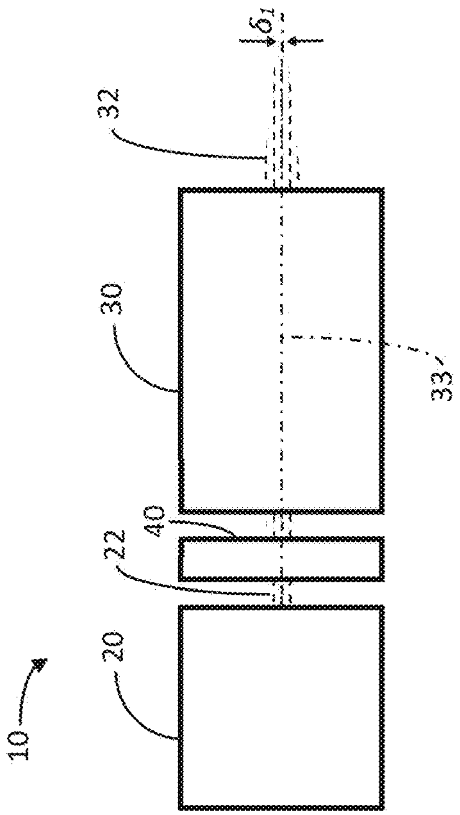
FIGS. 1A and 1B schematically illustrate two examples of an apparatus in accordance with certain implementations described herein.
Figure 1A:
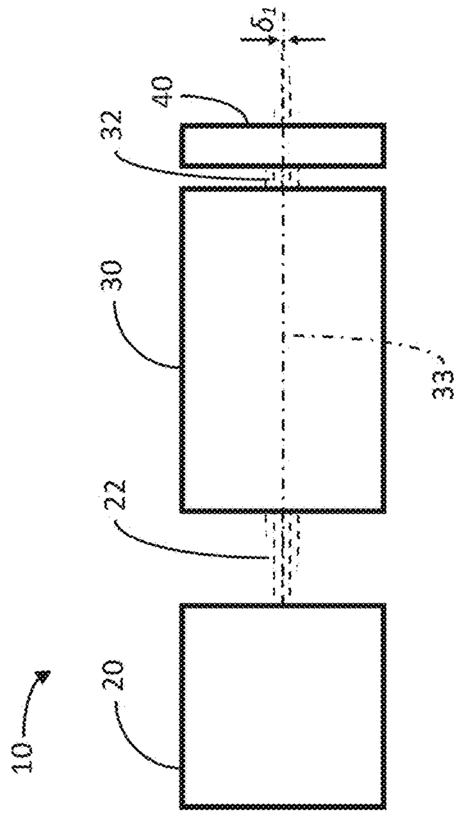
Figure 1A:
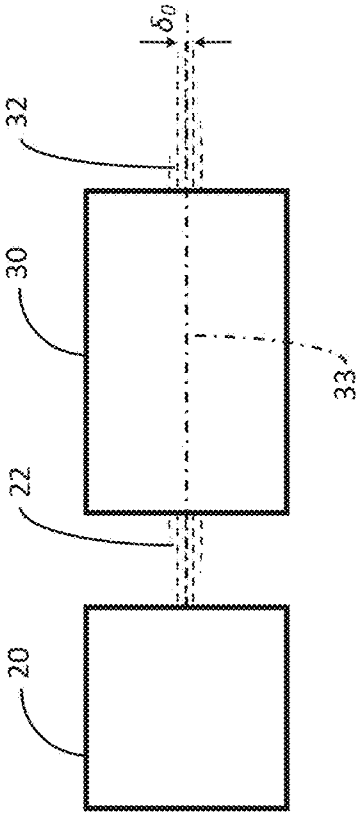

FIGS. 1A and 1B schematically illustrate two examples of an apparatus 10 in accordance with certain implementations described herein. The apparatus 10 comprises at least one x-ray source 20 configured to generate x-rays 22, at least one capillary x-ray focusing optic 30 configured to receive and focus at least some of the generated x-rays 22 into a focused x-ray beam 32, and at least one x-ray optical component 40 configured to receive the generated x-rays 22 and/or the focused x-ray beam 32 such that a focus size $\delta_1$ of the focused x-ray beam 32 is smaller than a focus size $\delta_0$ of the focused x-ray beam 32 without the at least one x-ray optical component 40. In FIG. 1A, the at least one x-ray optical component 40 is downstream from the at least one capillary x-ray focusing optic 30, while in FIG. 1B, the at least one x-ray optical component 40 is upstream from the at least one capillary x-ray focusing optic 30. FIG. 1C schematically illustrates an example prior art system without the at least one x-ray optical component 40.

The full-width-at-half-maximum (FWHM) focus size δ of a focused x-ray beam 32 generated by an apparatus 10 in accordance with certain implementations described herein (e.g., diameter or width of the focused x-ray beam 32 at the focus in a cross-sectional plane substantially perpendicular to the x-ray propagation axis 33) can be approximately expressed as:

$$\delta=[(S/M)^2+P^2]^{1/2} \quad (1)$$

where S is the FWHM x-ray source size (e.g., diameter or width of the x-ray source spot 27), M is the demagnification of the x-ray source 20 by the at least one capillary x-ray focusing optic 30, and P is the FWHM focus size of the at least one capillary x-ray focusing optic 30 (e.g., the FWHM of the x-ray focus size of the at least one capillary x-ray focusing optic 30 with an infinitely small spot size of the at least one x-ray source 20 and/or infinitely large M). The x-ray flux F of the apparatus 10 with the at least one capillary x-ray focusing optic 30 can be approximately expressed as:

$$F=B*G*\pi*(S/2)^2*H \quad (2)$$

where B is the x-ray source brightness in x-rays per millimeter square and per milliradian square, G is the solid angle of x-ray collection, and H is the efficiency of the at least one capillary x-ray focusing optic 30. The x-ray flux density $F_d$ of a focused x-ray beam 32 can be approximately expressed as:

$$F_d=F/[\pi*(\delta/2)^2]=B*G*H*(S/\delta)^2=B*G*H*M^2/[1+(M*P/S)^2]. \quad (3)$$

For electron impact x-ray sources 20 which emit x-rays 22 over a large solid angle, the at least one capillary x-ray focusing optic 30 with a solid angle of x-ray collection G from the at least one x-ray source 20 (e.g., $$\sqrt{G}*\frac{1}{2}$$

is limited to the numerical aperture of the at least one capillary x-ray focusing optic 30.

Exp. (1) shows that the focus of the apparatus 10 is limited by a demagnified source image (S/M) and by the point spread function (PSF) P of the at least one capillary x-ray focusing optic 30. Exp. (3) shows that a small ratio M*P/S (e.g., the ratio of the focus size of the at least one capillary x-ray focusing optic 30 to the demagnified x-ray source spot size S/M is less than 1) can reduce (e.g., minimize) its effect on the reduction of x-ray flux density $F_d$. For example, the reduction of $F_d$ can be 20%, 50%, and 80% for P*M/S=0.5, 1, and 2, respectively.

In certain implementations, the apparatus 10 is configured to generate a focused x-ray beam 32 having a focus size less than 10 microns (e.g., less than 3 microns, less than 1 micron; less than 0.5 micron; less than 0.3 micron) with an x-ray source spot size S less than 25 microns (e.g., less than 10 microns; less than 3 microns; less than 1 micron) and/or with a demagnification M greater than 1 (e.g., greater than 3; greater than 5; greater than 10) and a point spread function P less than 10 microns (e.g., less than 3 microns; less than 1 micron; less than 0.5 micron; less than 0.3 micron). In certain implementations, to preserve the brightness of the at least one x-ray source 20, P is approximately equal to the ratio S/M, or at least within the range of 10% to 100% (e.g., in the range of 20% to 80%) of the ratio S/M. In certain implementations, the value of M is configured to obtain a small focus (e.g., M in the range of 1× to 10×). One non-limiting example of obtaining a spot size less than 0.5 micron is using at least one x-ray source 20 with a spot size of 2 microns, a demagnification M of 7×, and a point spread function P of the at least one capillary x-ray focusing optic 30 of 0.4 micron. In certain implementations, the apparatus 10 is configured to provide a working distance (e.g., the distance between the output end of the at least one capillary x-ray focusing optic 30 and the focus) that is less than 50 mm (e.g., less than 20 mm; less than 5 mm).

Figure 2A:
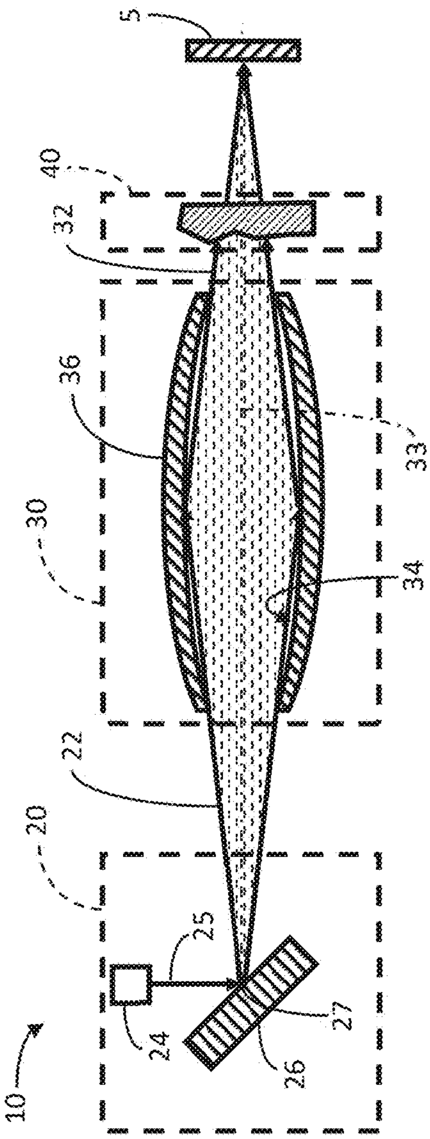
FIGS. 2A and 2B schematically illustrate two example apparatus in accordance with certain implementations described herein.
Figure 2B:
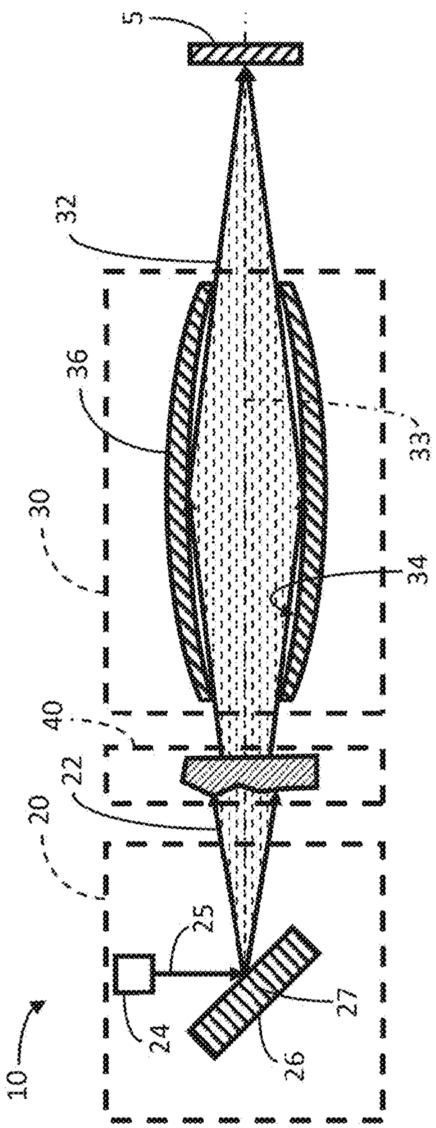

FIGS. 2A and 2B schematically illustrate two example apparatus 10 in accordance with certain implementations described herein. In FIG. 2A, the at least one capillary x-ray focusing optic 30 receives generated x-rays 22 from the at least one x-ray source 20 and the at least one x-ray optical component 40 receives the focused x-ray beam 32 from the at least one capillary x-ray focusing optic 30 and modifies the spatial distribution of the focused x-ray beam 32. In FIG. 2B, the at least one x-ray optical component 40 receives generated x-rays 22 from the at least one x-ray source 20 and modifies the spatial distribution of the generated x-rays 22, and the at least one capillary x-ray focusing optic 30 receives the generated x-rays 22 from the at least one x-ray optical component 40. As seen in FIGS. 2A and 2B, the focused x-ray beam 32 can impinge a sample 5 with the focus of the focused x-ray beam 32 on or in the sample 5.

X-Ray Source

In certain implementations, the at least one x-ray source 20 comprises a reflection-geometry x-ray source 20 comprising at least one electron beam generator 24 configured to generate at least one electron beam 25 and at least one x-ray target 26 configured to generate the x-rays 22 in response to being irradiated by the at least one electron beam 25 from the at least one electron beam generator 24. In certain implementations, a micro focus x-ray source 20 with a small x-ray source spot size (e.g., less than 25 microns; less than 10 microns; less than 3 microns; less than 1 micron) is used. In certain implementations, the electron beam energy of the at least one electron beam 25 is in a range of 5 kVp to 100 kVp. In certain implementations, the shape of the at least one electron beam 25 on the at least one x-ray target 26 is elongated with a ratio of the long dimension to the short dimension larger than 1.5× (e.g., larger than 3×; larger than 10×) and the x-rays 22 emitted from the at least one x-ray source 20 have a small takeoff angle relative to the surface of the at least one x-ray target 26 (e.g., less than 35 degrees; less than 20 degrees; less than 10 degrees), resulting in a reduced x-ray source spot size viewed from the x-ray takeoff angle. In certain implementations, the at least one x-ray target 26 of the reflection-geometry x-ray source 20 comprises at least one transition metal target material (e.g., Cr, Fe, Co, Cu, etc.) or a target material configured to produce a strong characteristic line of energy less than 25 keV (e.g., less than 12 keV; less than 8 keV; less than 4 keV). In certain implementations, the at least one x-ray source 20 comprises a plurality of x-ray-generating target materials (e.g., Cu, Cr, Co, W, Au, Mo. Rh, Pd, Ag). Lower x-ray energies (e.g., less than 25 keV; less than 10 keV; less than 8 keV) can be more efficiently collected and focused by the capillary x-ray focusing optic 30 as the critical angle for x-ray reflection is inversely proportional to x-ray energy. In certain implementations, the at least one x-ray source 20 has a plurality of x-ray targets 26 configured to provide predetermined spectral properties (e.g., characteristic lines). To achieve high brightness, the at least one x-ray source 20 can have the at least one x-ray target 26 in thermal contact with a high thermal conductivity substrate such as diamond (e.g., formed using sputter deposition on the substrate). In certain implementations, the at least one x-ray target 26 has a thermal conductive path to the vacuum system (e.g., vacuum hosing) of the at least one x-ray source 20. In certain other implementations, the at least one x-ray source 20 comprises a transmission-geometry x-ray source 20. In certain implementations, the at least one x-ray source 20 comprises a linear accumulation x-ray source 20 (see, e.g., U.S. Pat. No. 9,390,881).

In certain implementations, the at least one x-ray source 20 and the at least one capillary x-ray focusing optic 30 are pre-aligned with one another (e.g., to reduce or minimize a focus of the focused x-ray beam 32). For example, the at least one x-ray source 20 and the at least one capillary x-ray focusing optic 30 can be mechanically attached to one other as a monolithic microbeam system. The microbeam system can be sufficiently compact and motorized to move such that the focused x-ray beam 32 emitted from the at least one capillary x-ray focusing optic 30 is controllably scanned across a sample 5.

Capillary X-Ray Focusing Optic

In certain implementations, the capillary x-ray focusing optic 30 has an inner surface 34 with a surface profile comprising at least one segment of a rotationally symmetric quadric surface (e.g., ellipsoid, paraboloid, hyperboloid, etc.) having at least one focal point. The capillary x-ray focusing optic 30 can be aligned to the at least one x-ray source 20 such that one of the focal points of the quadric surface is at the x-ray source spot 27. In certain implementations, the capillary x-ray focusing optic 30 comprises a Wolter optic (e.g., comprising an ellipsoidal segment and a hyperboloid segment downstream from the ellipsoidal segment). The Wolter optic can be configured to produce an image of the x-ray source spot 27 on or in a sample 5 and to demagnify the x-ray source spot 27. Capillary x-ray focusing optics 30 can provide various advantages for x-ray focusing applications, including but not limited to: large numerical aperture (e.g., 2 times the critical angle), achromaticity, concurrent focusing in two orthogonal directions, short working distances, and/or high transmission efficiency.

In certain implementations, the profile of the inner reflecting surface of the capillary x-ray focusing optic 30 is measured to determine its deviation from the predetermined profile (e.g., using either optical and/or x-ray metrology methods). An example optical metrology method uses one or more high resolution optical microscopes configured to have an optical imaging axis perpendicular to the long axis of the capillary x-ray focusing optic 30. The one or more optical microscopes can measure the capillary x-ray focusing optic 30 as the capillary x-ray focusing optic 30 is suspended in air, with the long axis parallel to gravity. In certain implementations, at least one optical microscope is moved relative to the capillary x-ray focusing optic 30 along the long axis of the capillary x-ray focusing optic 30 to measure the inner diameter of the capillary x-ray focusing optic 30. In certain implementations, the capillary x-ray focusing optic 30 is also rotated relative to the at least one optical microscope during the measurement of the inner surface. Rotation can also be used to obtain radial shape errors.

Figure 3:
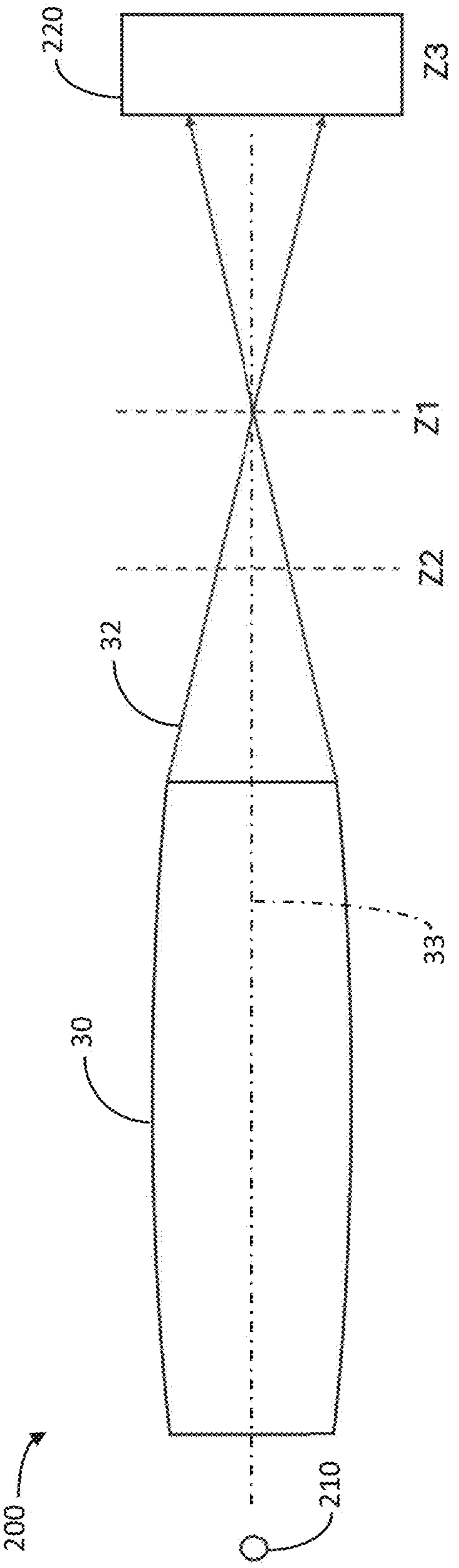
FIG. 3 schematically illustrates an example x-ray metrology system compatible with certain implementations described herein.

In certain implementations, x-ray metrology can be used (e.g., alternatively or in addition to optical metrology) to evaluate the capillary x-ray focusing optic 30. FIG. 3 schematically illustrates an example x-ray metrology system 200 compatible with certain implementations described herein. The x-ray metrology system 200 of FIG. 3 comprises a microfocus x-ray source 210 configured to illuminate the capillary x-ray focusing optic 30 and a two-dimensional x-ray camera 220 fixed at a stationary position Z3. In certain implementations, the stationary position Z3 is past the focal point of the capillary x-ray focusing optic 30. A knife edge is scanned at a first distance Z1 from the exit of the capillary x-ray focusing optic 30, with the position of the knife edge at Z1 corresponding to the focal plane or the focus of the capillary x-ray focusing optic 30. In certain implementations, knife edge scans are also performed at a second distance Z2 from the exit of the capillary x-ray focusing optic 30. The scanning of the knife edge (e.g., at Z1 and/or Z2) can be performed in two substantially orthogonal directions, both of which are substantially orthogonal to the x-ray propagation axis 33. By processing the measured x-ray beam profiles (e.g., ray tracing), the surface profile of the capillary x-ray focusing optic 30 can be determined.

Figure 4B:
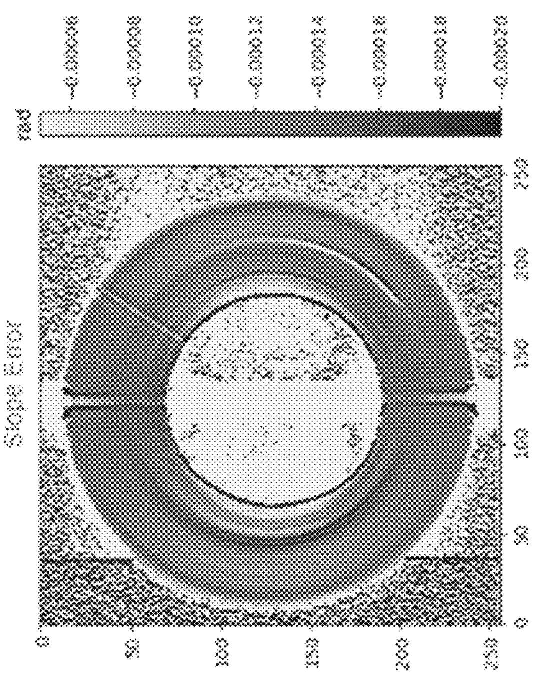
FIGS. 4A and 4B schematically illustrate an example knife edge scan and the one-dimensional derivative of the angles, respectively, in accordance with certain implementations described herein.
Figure 4A:
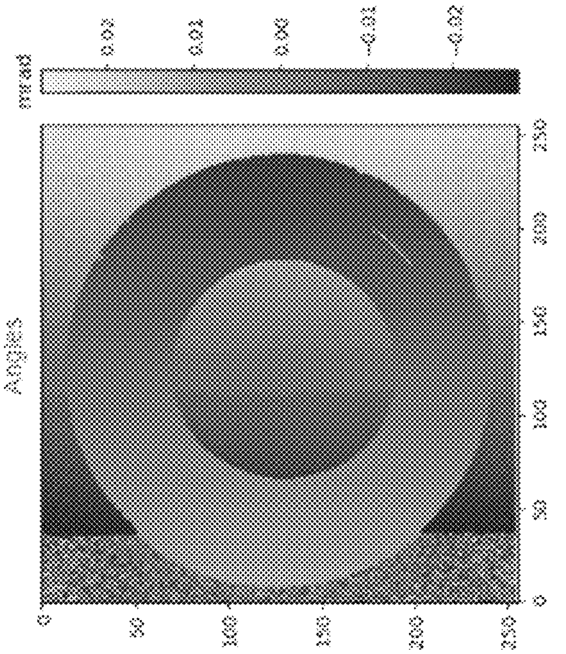

FIGS. 4A and 4B schematically illustrate an example knife edge scan and the one-dimensional derivative of the angles, respectively, in accordance with certain implementations described herein. The knife edge scan of FIG. 4A can be used to determine the reflection angle at each patch of the inner surface of the capillary x-ray focusing optic 30, and the one-dimensional derivative of the angles of FIG. 4B can provide the slope error. In certain implementations, knife edge scans at positions Z1 and Z2 are used to determine the intensity lost in each pixel of the image obtained by the two-dimensional x-ray camera 220 by correlation with the position of the knife edge. This information can be used to calculate rays responsible for the intensity in each part of the image. In an ideal case, one scan cuts the focus of the capillary x-ray focusing optic 30 as the highest resolution can be achieved for the fewest number of images. Images collected further from the focus can be done as step sizes that would give similar or greater angular resolution than the scan at the focal plane. Important information from the metrology measurement can include, but are not limited to, straightness errors of some segments of the capillary x-ray focusing optic 30 from a main (e.g., mean) axis of the whole capillary x-ray focusing optic 30 and surface figure errors of one or more portions of the capillary x-ray focusing optic 30 (e.g., deviation from the predetermined surface figure).

In certain implementations, a commercial interferometric system is used (e.g., non-limiting examples include Keyence VK-300; Lumetrics OptiGauge II; Bristol Instruments). In certain implementations, thicknesses of boundaries (e.g., walls, central hole, etc.) are measured at specific points along the capillary x-ray focusing optic 30 by relative motorized motion of the capillary x-ray focusing optic 30 to the interferometric system. These thickness measurements can be compared to a reference flat to determine form error.

In certain implementations, the surface profile of the capillary x-ray focusing optic 30 is close to ideal, but has at least one deviation (e.g., kink) in the straightness of the capillary x-ray focusing optic 30. In such cases, the capillary x-ray focusing optic 30 can be sectioned at the at least one deviation and can then be reattached to reduce (e.g., minimize) the number of deviations. Reattachment can occur using a mechanical holder and/or adhesive, such as epoxy. To align the portions of the capillary x-ray focusing optic 30, a visible light laser and/or x-rays can be used. Alternatively, or in addition, the surface profile of the capillary x-ray focusing optic 30 can be measured using one or more optical microscopes that move relative to the capillary x-ray focusing optic 30.

X-Ray Optical Component

In certain implementations, the at least one x-ray optical component 40 comprises a three-dimensional (3D) microstructure configured to correct for surface errors of the at least one capillary x-ray focusing optic 30 to obtain a finer focus of the focused x-ray beam 32. For example, the 3D microstructure can be configured to reduce (e.g., minimize; prevent) contributions to the focused x-ray beam 32 emitted by the apparatus 10 from surface errors of predetermined regions of the at least one capillary x-ray focusing optic 30.

In certain implementations, the at least one capillary x-ray focusing optic 30 comprises nested capillary x-ray focusing optics 30 having one or more capillary x-ray focusing optics 30 nested inside one or more capillary x-ray focusing optics 30. The capillary x-ray focusing optics 30 can have substantially the same maximum x-ray incidence angle for focusing x-rays of a predetermined maximum x-ray energy. The maximum x-ray incidence angles on at least two nested capillary x-ray focusing optics 30 can be different from one another by more than 20% (e.g., more than 50%; more than 100%). In certain implementations, a single x-ray optical component 40 is configured to at least partially compensate (e.g., correct) for some figure errors for at least one of the nested capillary x-ray focusing optics 30. In certain implementations, a single x-ray optical component 40 is configured to at least partially compensate (e.g., correct) for some figure errors for at least two of the nested capillary x-ray focusing optics 30.

Figure 5A:
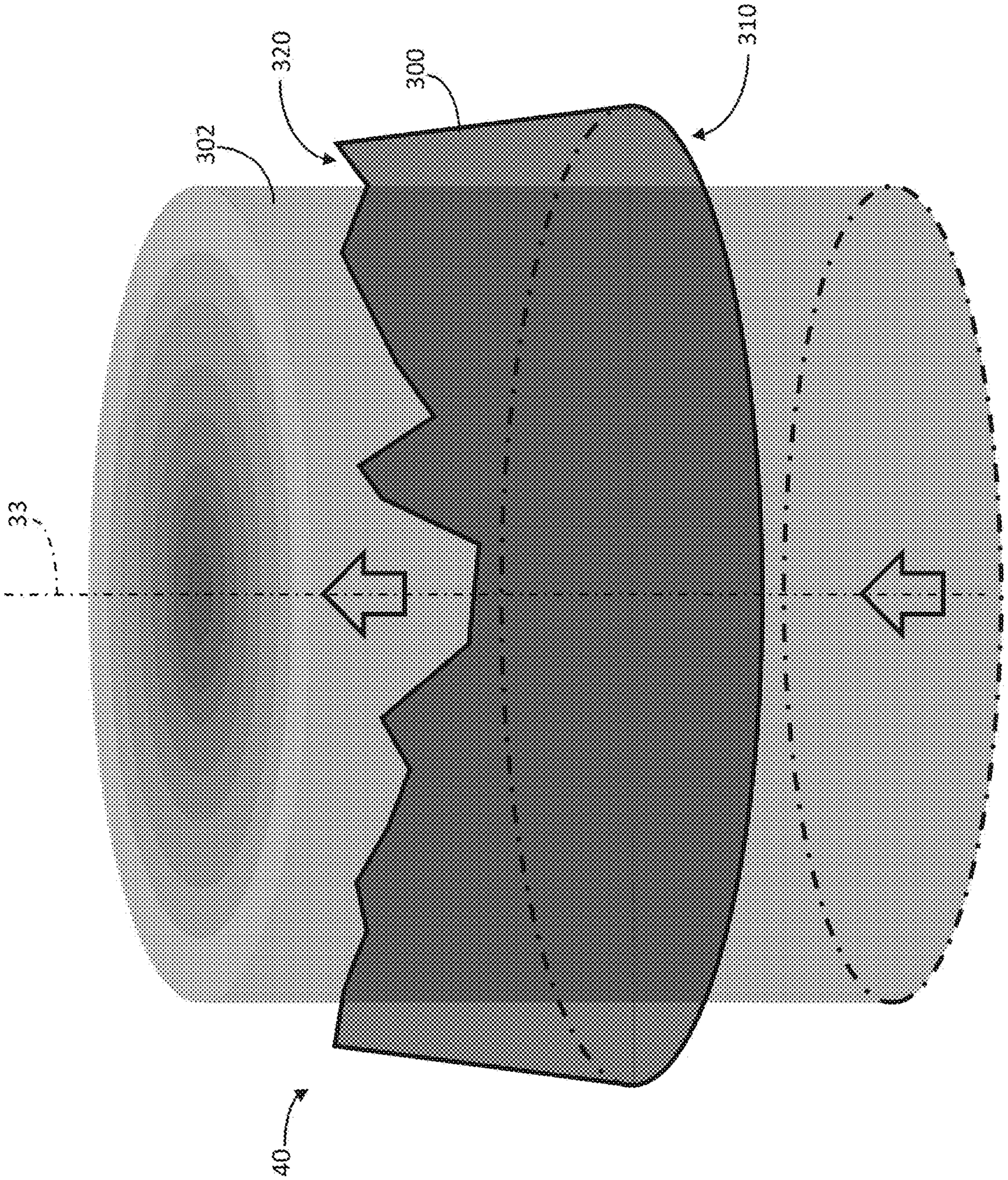
FIGS. 5A and 5B schematically illustrate two examples of at least one x-ray optical component comprising at least one refractive 3D optic and at least one mask, respectively, in accordance with certain implementations described herein.
Figure 5B:
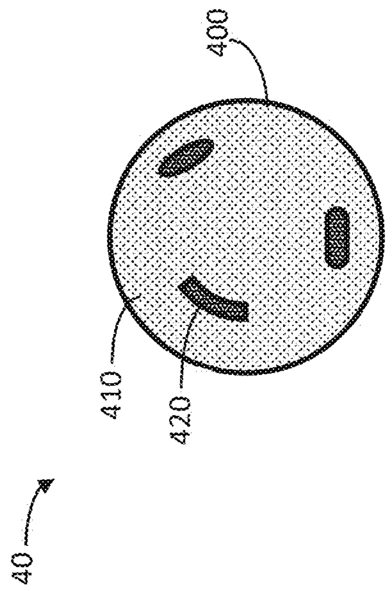

FIGS. 5A and 5B schematically illustrate two examples of at least one x-ray optical component 40 comprising at least one refractive 3D optic 300 and at least one mask 400, respectively, in accordance with certain implementations described herein. In certain implementations, the at least one x-ray optical component 40 either at least one refractive 3D optic 300, at least one mask 400, or both at least one refractive 3D optic 300 and at least one mask 400 (e.g., both a refractive 3D optic 300 and a mask 400 in a unitary structure). In certain implementations, the at least one x-ray optical component 40 (e.g., comprising a refractive 3D optic 300 and a mask 400) are configured to at least partially compensate (e.g., correct) for figure errors of the at least one capillary x-ray focusing optic 30 to achieve a collective PSF of the optical chain (e.g., the combination the at least one x-ray focusing optic 30 and the at least one x-ray optical component 40) that is below 1 micron (e.g., less than 0.5 micron; less than 0.4 micron; less than 0.3 micron, etc.).

In certain implementations, as shown in FIG. 5A, the at least one x-ray optical component 40 comprises at least one refractive 3D optic 300 (e.g., corrective plate) configured to be used in combination with the at least one capillary x-ray focusing optic 30. The at least one refractive 3D optic 300 can be configured to allow an x-ray beam 302 (e.g., at least some of the generated x-rays 22 and/or the focused x-ray beam 32) to propagate through the refractive 3D optic 300, such that predetermined changes of phase and/or wavefront are applied to the propagating x-ray beam 302. The predetermined changes of phase and/or wavefront can at least partially compensate (e.g., correct) for surface errors of the at least one capillary x-ray focusing optic 30 such that a FWHM focus size δ of the focused x-ray beam 32 (e.g., impinging a sample 5) is less than 10 microns (e.g., less than 3 microns, less than 1 micron; less than 0.5 micron; less than 0.3 micron).

As shown in FIG. 5A, the x-ray beam 302 propagates along the x-ray propagation axis 33, impinges a first surface portion 310 of the refractive 3D optic 300, and emanates from a second surface portion 320 of the refractive 3D optic 300. The refractive 3D optic 300 of FIG. 5A is configured to be between the at least one x-ray source 20 and the at least one capillary x-ray focusing optic 30, and the x-ray beam 302 prior to impinging the first surface portion 310 has a substantially uniform phase and/or wavefront (e.g., the x-ray beam 302 comprising the generated x-rays 22 from the at least one x-ray source 20), and the x-ray beam 302 after emanating from the second surface portion 320 has a substantially non-uniform phase and/or wavefront. Alternatively, the refractive 3D optic 300 is configured to be between the at least one capillary x-ray focusing optic 30 and the focus of the at least one capillary x-ray focusing optic 30, and the x-ray beam 302 prior to impinging the first surface portion 310 has a substantially non-uniform phase and/or wavefront (e.g., the x-ray beam 302 comprising the focused x-ray beam 32 from the at least one capillary x-ray focusing optic 30), and the x-ray beam 302 after emanating from the second surface portion 320 has a substantially uniform phase and/or wavefront. In both of these configurations, the refractive 3D optic 300 is configured to compensate (e.g., correct) for optical errors in the phase and/or wavefront that result from portions of the x-ray beam 302 reflecting from aberrant regions of the at least one capillary x-ray focusing optic 30.

While FIG. 5A schematically shows an implementation in which the substantially modified phase and/or wavefront have values that are substantially symmetric about the x-ray propagation axis 33, the values of the substantially modified phase and/or wavefront in certain other implementations are non-symmetric about the x-ray propagation axis 33 (e.g., vary with angle about the x-ray propagation axis 33). In certain implementations, one of the first surface portion 310 and the second surface portion 320 is substantially flat and the other of the first surface portion 310 and the second surface portion 320 is substantially contoured (see, e.g., FIG. 5A), while in certain other implementations, both of the first surface portion 310 and the second surface portion 320 are substantially contoured. In certain implementations, the contoured surface portion (e.g., the second surface portion 320) comprise sharp features (see, e.g., FIG. 5A), in certain other implementations, the contoured surface portion comprises relatively smooth features that still exhibit significant topology to affect the phase and/or wavefront of the propagating x-ray beam 302 (e.g., sufficient topology to correct optical phase and/or wavefront errors due to reflections from aberrant portions of the at least one capillary x-ray focusing optic 30).

In certain implementations (e.g., to reduce or minimize x-ray attenuation by the refractive 3D optic 300), the refractive 3D optic 300 comprises one or more materials consisting essentially of low atomic number (Z) elements having atomic numbers less than 15 (e.g., organic materials; SU-8 resist; materials comprising at least 40% volume concentration of low Z elements, including but not limited to: H, Li, Be, B, C, and N). For example, the at least one refractive 3D optic 300 can comprise at least one polymer material, examples of which include but are not limited to: polyimide, polylactic acid, and photopolymers. In certain implementations, the at least one refractive 3D optic 300 is fabricated using an additive or subtractive manufacturing process (e.g. 3D printing; 3D lithography). In certain implementations, the at least one refractive 3D optic 300 comprises features (e.g., 2D features; 3D features) with outer dimensions less than 20 microns (e.g., less than 5 microns; less than 1 micron) in at least one direction (e.g., in two substantially orthogonal directions; in three substantially orthogonal directions). In certain implementations, the at least one refractive 3D optic 300 is configured to be either upstream or downstream from the at least one capillary x-ray focusing optic 30 (e.g., ellipsoidal optic or Wolter optic). In certain other implementations in which the at least one capillary x-ray focusing optic 30 comprises two separate capillary x-ray focusing optics 30 (e.g., two separate paraboloidal mirrors; a Wolter optic comprising an individual hyperboloidal mirror and an individual ellipsoidal mirror), the at least one refractive 3D optic 300 is configured to be between the two separate capillary x-ray focusing optics 30.

In certain implementations, the thickness and lateral profile of the 3D refractive optic 300 (e.g., corrector plate) is calculated by measuring the wavefront of the at least one capillary x-ray focusing optic 30 downstream past the focus of the at least one capillary x-ray focusing optic 30. For example, such measurements can be obtained by rotating a knife edge being impinged by the focused x-ray beam 32 throughout at least 180 degrees (e.g., more than 240 degrees; more than 360 degrees) in steps (e.g., less than 1 degree; less than 5 degrees; less than 10 degrees, etc.) to measure a rotationally variant wavefront error. These measurements can be made in combination with a coherent x-ray source, such as a synchrotron x-ray source or a laboratory source of x-rays that is sufficiently monochromatic (e.g., greater than 40%; greater than 50%; greater than 80%, etc. within a predetermined characteristic x-ray energy) and/or with x-rays that propagate through a monochromator. In certain implementations, the at least one refractive 3D optic 300 is designed and configured in correspondence of the measured wavefront error of the at least one capillary x-ray focusing optic 30. In certain implementations, the at least one refractive 3D optic 300 is designed and configured to improve a straightness of the at least one capillary x-ray focusing optic 30. The wavefront error can then be used to develop the at least one refractive 3D optic 300, which can be placed either upstream or downstream from the at least one capillary x-ray focusing optic 30. In certain implementations, the at least one refractive 3D optic 300 is attached to the at least one capillary x-ray focusing optic 30. In certain implementations, the at least one capillary x-ray focusing optic 30 has relatively small errors (e.g., PSF less than 3 microns; PSF less than 2 microns; PSF less than 1 micron) and the 3D refractive optic 300 is configured to bring the complete PSF of the apparatus 10 to less than 1 micron (e.g., less than 0.5 micron; less than 0.4 micron; less than 0.3 micron).

Figure 6A:
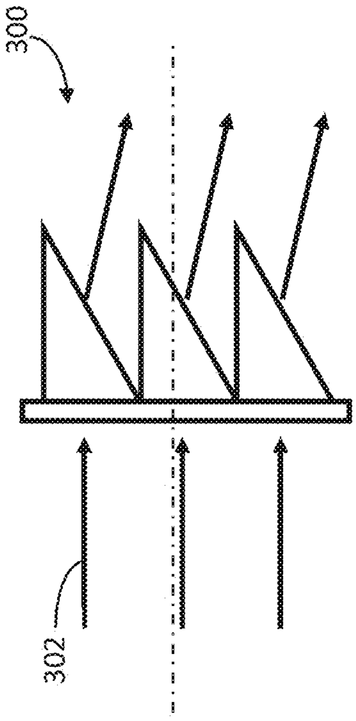
FIGS. 6A and 6B schematically illustrates cross-sectional views of portions of two example contoured surface profiles of a refractive 3D optic in accordance with certain implementations described herein.
Figure 6B:
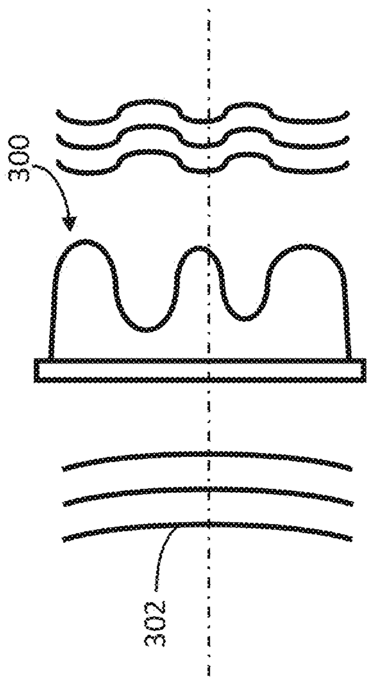

FIGS. 6A and 6B schematically illustrates cross-sectional views of portions of two example contoured surface profiles (e.g., height profiles) of a refractive 3D optic 300 in accordance with certain implementations described herein. The example contoured surface profile of FIG. 6A comprises a 3D staircase profile on a substrate and is configured to cause angular changes of x-rays in portions of the x-ray beam 302 that at least partially compensate (e.g., correct) for straightness error of a surface segment of the at least one capillary x-ray focusing optic 30 (e.g., the angular changes having magnitudes that are substantially equal to the angular deviation of the centerline of the surface segment from the main centerline of the capillary x-ray focusing optic 30 with opposite sign). In certain other implementations, straightness error is at least partially compensated (e.g., corrected) by mechanical bending at least one segment of the capillary x-ray focusing optic 30, such that at least one axis of the at least one segment is aligned to a main axis of the capillary x-ray focusing optic 30. In certain implementations, the mechanical bending is used in combination with the refractive 3D optic 300 to compensate (e.g., correct) for some or all of the figure errors of the capillary x-ray focusing optic 30.

The example contoured surface portion of FIG. 6B comprises a 3D structure on a substrate and is configured to cause phase changes in portions of the x-ray beam 302 that compensate (e.g., correct) for cylindrical symmetric shape errors (e.g., figure errors) along the axis of the at least one capillary x-ray focusing optic 30 (e.g., the phase changes having magnitudes that are substantially equal to phase changes of aberrant surface portions of the capillary x-ray focusing optic 30 with opposite sign). In certain implementations, the refractive 3D optic 300 is configured to correct astigmatism of the at least one capillary x-ray focusing optic 30. In certain implementations, the refractive 3D optic 300 is configured to simultaneously correct multiple (e.g., all) figure errors (e.g., straightness, shape errors, and astigmatism) of the at least one capillary x-ray focusing optic 30. In certain implementations, a plurality of refractive 3D optics 300 is used to simultaneously correct some or all the figure errors (e.g., straightness; shape errors).

In certain implementations, as shown in FIG. 5B, the at least one x-ray optical component 40 comprises at least one mask 400 comprising at least one x-ray transmissive region 410 and at least one x-ray absorptive region 420. The at least one mask 400 is configured to allow some x-rays of the x-ray beam 302 (e.g., at least some of the generated x-rays 22 and/or the focused x-ray beam 32) to propagate through the at least one mask 400, and to block other x-rays of the x-ray beam 302 from propagating through the at least one mask 400. For example, the at least one mask 400 can inhibit (e.g., block; prevent) x-rays from impinging specific regions of the at least one capillary x-ray focusing optic 30 that have previously been determined to have substantial surface errors from contributing to the FWHM focus size δ of the focused x-ray beam 32 (e.g., substantial surface errors being surface errors that would add at least 1 micron to the FWHM focus size δ of the focused x-ray beam 32). For another example, the at least one mask 400 can inhibit (e.g., block; prevent) x-rays that reflect from the specific regions of the at least one capillary x-ray focusing optic 30 from contributing to the FWHM focus size δ of the focused x-ray beam 32. For example, the at least one mask 400 can be positioned within the path of the focused x-ray beam 32 to block x-rays reflected from sections of the at least one capillary x-ray focusing optic 30 having straightness error or having surface profiles deviating from the predetermined profile by more than a predetermined value in the reflection plane (e.g., more than 200 nm; more than 50 nm; more than 10 nm; more than 2 nm), while allowing other x-rays reflected by other sections having adequate surface profiles to propagate through.

In certain implementations, the at least one mask 400 is upstream of the at least one capillary x-ray focusing optic 30, while in certain other implementations, the at least one mask 400 is downstream from the at least one capillary x-ray focusing optic 30. In certain other implementations in which the at least one capillary x-ray focusing optic 30 comprises two separate capillary x-ray focusing optics 30, the at least mask 400 is configured to be between the two separate capillary x-ray focusing optics 30. The shape/pattern of the at least one mask 400 can be designed based on metrology measurements of the at least one capillary x-ray focusing optic 30. In certain implementations, the at least one x-ray transmissive region 410 comprises one or more materials consisting essentially of low atomic number (Z) elements having atomic numbers less than 15 (e.g., organic materials; polymers; SU-8 resist; materials comprising at least 40% volume concentration of low Z elements, including but not limited to: H, Li, Be, B, C, and N). In certain implementations, the at least one x-ray absorptive region 420 comprises one or more materials consisting essentially of one or more atomic elements having atomic numbers greater than 15 (e.g., metals).

While certain implementations are described herein with regard to using the at least one x-ray optical component 40 with at least one capillary x-ray focusing optic 30, in certain other implementations, the at least one x-ray optical component 40 is used with at least one capillary x-ray collimating optic (e.g., single paraboloids). For example, the apparatus 10 can comprise at least one x-ray source 20 configured to generate x-rays 22, at least one capillary x-ray collimating optic (e.g., single paraboloid) configured to receive and collimate at least some of the generated x-rays 22 into a collimated x-ray beam, and at least one x-ray optical component 40 configured to receive the generated x-rays 22 and/or the collimated x-ray beam such that a divergence angle of the collimated x-ray beam (e.g., in a range of 1 microradian to 50 microradians) is smaller than a divergence angle of the collimated x-ray beam without the at least one x-ray optical component 40. The at least one x-ray optical component 40 can be downstream from the at least one capillary x-ray collimating optic, or the at least one x-ray optical component 40 can be upstream from the at least one capillary x-ray collimating optic.

Although commonly used terms are used to describe the systems and methods of certain implementations for ease of understanding, these terms are used herein to have their broadest reasonable interpretations. Although various aspects of the disclosure are described with regard to illustrative examples and implementations, the disclosed examples and implementations should not be construed as limiting. Conditional language, such as "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements, and/or steps are in any way required for one or more implementations. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Conjunctive language such as the phrase "at least one of X, Y, and Z," unless specifically stated otherwise, is to be understood within the context used in general to convey that an item, term, etc. may be either X, Y, or Z. Thus, such conjunctive language is not generally intended to imply that certain implementations require the presence of at least one of X, at least one of Y, and at least one of Z.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than," less than," "between," and the like includes the number recited. As used herein, the meaning of "a," "an," and "said" includes plural reference unless the context clearly dictates otherwise. Also, as used in the description herein, the meaning of "in" includes "into" and "on," unless the context clearly dictates otherwise.

While the structures and/or methods are discussed herein in terms of elements labeled by ordinal adjectives (e.g., first, second, etc.), the ordinal adjectives are used merely as labels to distinguish one element from another, and the ordinal adjectives are not used to denote an order of these elements or of their use.

Various configurations have been described above. It is to be appreciated that the implementations disclosed herein are not mutually exclusive and may be combined with one another in various arrangements. Although this invention has been described with reference to these specific configurations, the descriptions are intended to be illustrative of the invention and are not intended to be limiting. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various implementations and examples discussed above may be combined with one another to produce alternative configurations compatible with implementations disclosed herein. In addition, although the disclosed methods and apparatuses have largely been described in the context of various devices, various implementations described herein can be incorporated in a variety of other suitable devices, methods, and contexts.

Various aspects and advantages of the implementations have been described where appropriate. It is to be understood that not necessarily all such aspects or advantages may be achieved in accordance with any particular implementation. Thus, for example, it should be recognized that the various implementations may be carried out in a manner that achieves or optimizes one advantage or group of advantages as taught herein without necessarily achieving other aspects or advantages as may be taught or suggested herein.

What is claimed is:

1. An apparatus comprising:

at least one x-ray source configured to generate x-rays;

at least one capillary x-ray focusing optic configured to receive and focus at least some of the generated x-rays into a focused x-ray beam; and at least one x-ray optical component configured to receive the generated x-rays and/or the focused x-ray beam such that a focus size $\delta_1$ of the focused x-ray beam is smaller than a focus size $\delta_0$ of the focused x-ray beam without the at least one x-ray optical component.

2. The apparatus of claim 1, wherein the at least one x-ray source has a spot size less than 25 microns and the focus size $\delta_1$ of the focused x-ray beam is less than 10 microns.

3. The apparatus of claim 1, wherein the at least one capillary x-ray focusing optic has a demagnification greater than 1 and a point spread function less than 10 microns and the focus size $\delta_1$ of the focused x-ray beam is less than 10 microns.

4. The apparatus of claim 1, wherein the at least one x-ray source comprises a reflection-geometry x-ray source comprising at least one electron beam generator and at least one x-ray target configured to generate the x-rays in response to being irradiated by at least one electron beam from the at least one electron beam generator.

5. The apparatus of claim 1, wherein the at least one capillary x-ray focusing optic comprises a Wolter optic.

6. The apparatus of claim 1, wherein the at least one capillary x-ray focusing optic has a surface profile comprising at least one segment of a rotationally symmetric quadric surface.

7. The apparatus of claim 1, wherein the at least one x-ray optical component comprises a refractive corrector plate.

8. The apparatus of claim 1, wherein the at least one x-ray optical component comprises a mask configured to block x-rays from impinging predetermined regions of the at least one capillary x-ray focusing optic or to block x-rays reflecting from predetermined regions of the at least one capillary x-ray focusing optic.

9. An apparatus comprising:

at least one x-ray source configured to generate x-rays;

at least one capillary x-ray focusing optic configured to receive and focus at least some of the generated x-rays into a focused x-ray beam; and at least one x-ray optical component configured to receive the generated x-rays and/or the focused x-ray beam such that a collective point spread function (PSF) of the at least one x-ray focusing optic and the at least one x-ray optical component is below 1 micron.

10. The apparatus of claim 9, wherein the collective PSF of the at least one x-ray focusing optic and the at least one x-ray optical component is below 0.5 micron.

11. The apparatus of claim 9, wherein a focus size of the focused x-ray beam is less than 10 microns.

12. The apparatus of claim 11, wherein the at least one x-ray source has a spot size less than 25 microns.

13. The apparatus of claim 9, wherein the at least one capillary x-ray focusing optic has a demagnification greater than 3.

14. The apparatus of claim 9, wherein the at least one capillary x-ray focusing optic has a PSF less than 3 microns.

15. The apparatus of claim 9, wherein the focused x-ray beam is configured to impinge a sample with a spot size greater than the collective PSF.

16. The apparatus of claim 9, wherein the at least one capillary x-ray focusing optic receives the generated x-rays from the at least one x-ray source and the at least one x-ray optical component receives the focused x-ray beam from the at least one capillary x-ray focusing optic.

17. The apparatus of claim 9, wherein the at least one x-ray optical component receives the generated x-rays from the at least one x-ray source and modifies a spatial distribution of the generated x-rays, and the at least one capillary x-ray focusing optic receives the generated x-rays from the at least one x-ray optical component.

18. The apparatus of claim 9, wherein the at least one x-ray optical component is configured to reduce a FWHM focus size P of the at least one capillary x-ray focusing optic.

19. The apparatus of claim 9, wherein the at least one x-ray optical component comprises at least one refractive three-dimensional optic.

20. The apparatus of claim 9, wherein the at least one x-ray optical component comprises at least one mask.

* * * * *